(12) United States Patent
Nakayoshi et al.

(10) Patent No.: US 7,924,384 B2
(45) Date of Patent: Apr. 12, 2011

(54) DISPLAY DEVICE

(75) Inventors: Yoshiaki Nakayoshi, Ooamishirasato (JP); Kazuhiko Yanagawa, Mobara (JP); Takahiro Ochiai, Chiba (JP); Hirotaka Imayama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 1135 days.

(21) Appl. No.: 10/563,669

(22) PCT Filed: Jul. 14, 2003

(86) PCT No.: PCT/JP03/08927
§ 371 (c)(1),
(2), (4) Date: May 25, 2006

(87) PCT Pub. No.: WO2005/006068
PCT Pub. Date: Jan. 20, 2005

(65) Prior Publication Data
US 2007/0040978 A1 Feb. 22, 2007

(51) Int. Cl.
*G02F 1/1343* (2006.01)
(52) U.S. Cl. .................................................... 349/141
(58) Field of Classification Search .................. None
See application file for complete search history.

(56) References Cited

U.S. PATENT DOCUMENTS

| | | | |
|---|---|---|---|
| 6,128,061 | A | 10/2000 | Lee et al. |
| 6,195,140 | B1 | 2/2001 | Kubo et al. |
| 6,233,034 | B1 | 5/2001 | Lee et al. |
| 6,281,952 | B1 | 8/2001 | Okamoto et al. |
| 6,380,672 | B1 | 4/2002 | Yudasaka |
| 6,462,799 | B2 | 10/2002 | Ohta et al. |
| 6,714,276 | B2 * | 3/2004 | Yamada et al. ............... 349/180 |
| 6,914,656 | B2 * | 7/2005 | Sakamoto et al. ............ 349/141 |
| 2002/0001867 | A1 | 1/2002 | Sung et al. |
| 2002/0126241 | A1 * | 9/2002 | Kurahashi et al. ............ 349/114 |

FOREIGN PATENT DOCUMENTS

JP 2003-149664 5/2003
* cited by examiner

*Primary Examiner* — David Nelms
*Assistant Examiner* — Lucy P Chien
(74) *Attorney, Agent, or Firm* — Antonelli, Terry, Stout & Kraus, LLP.

(57) ABSTRACT

The present invention provides a liquid crystal display device which exhibits the excellent wide viewing angle characteristic and the high-speed responsiveness. A pixel region includes a switching element which is operated in response to a scanning signal from a gate signal line, a pixel electrode to which a video signal from a drain signal line is supplied through a switching element, and a counter electrode which generates an electric field between the counter electrode and the pixel electrode. The pixel region is constituted of divided respective regions. In one region, the counter electrode made of a light-transmitting material which is formed on the center except for a slight periphery of the region below an insulation film and the pixel electrode which is constituted of a group of electrodes which extend in one direction and are arranged in parallel to each other in the direction which intersects one direction above the insulation film in a state that the group of electrodes are overlapped to the counter electrode are formed. In another region, the counter electrode which is constituted of a group of electrodes which extend in one direction and are arranged in parallel to each other in the direction which intersects one direction below the insulation layer and the pixel electrode which is constituted of a group of electrodes which extend in one direction and are arranged in parallel in the direction which intersects one direction above the insulation film and is arranged alternately with the counter electrode are formed.

15 Claims, 26 Drawing Sheets

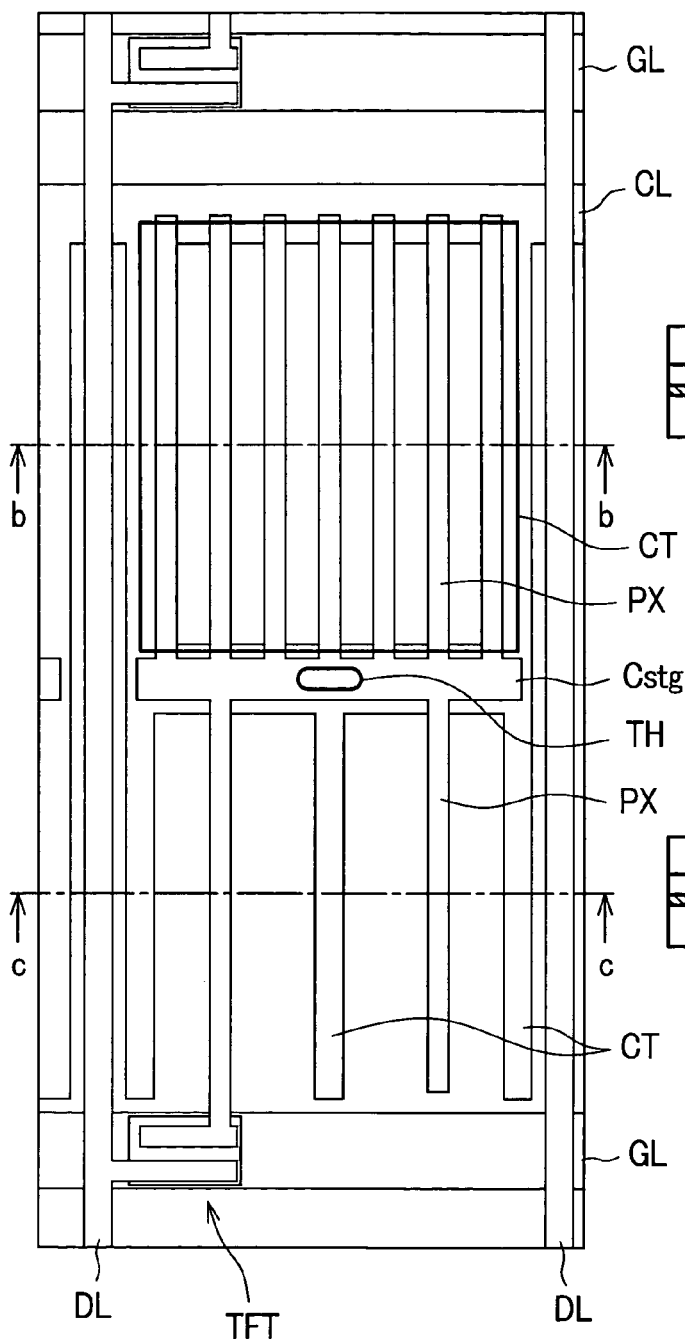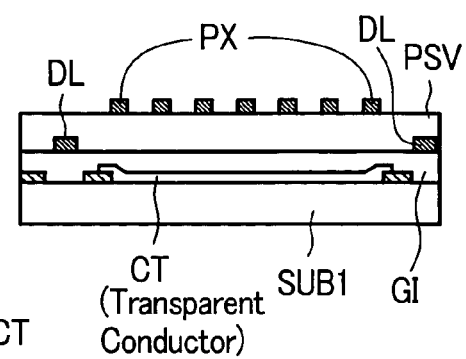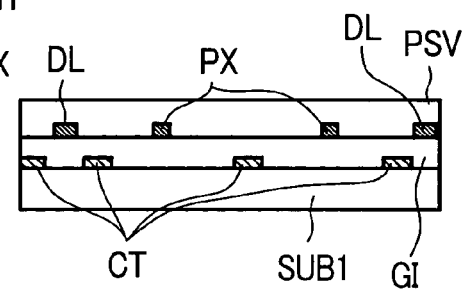

FIG. 17A
FIG. 17B
FIG. 17C
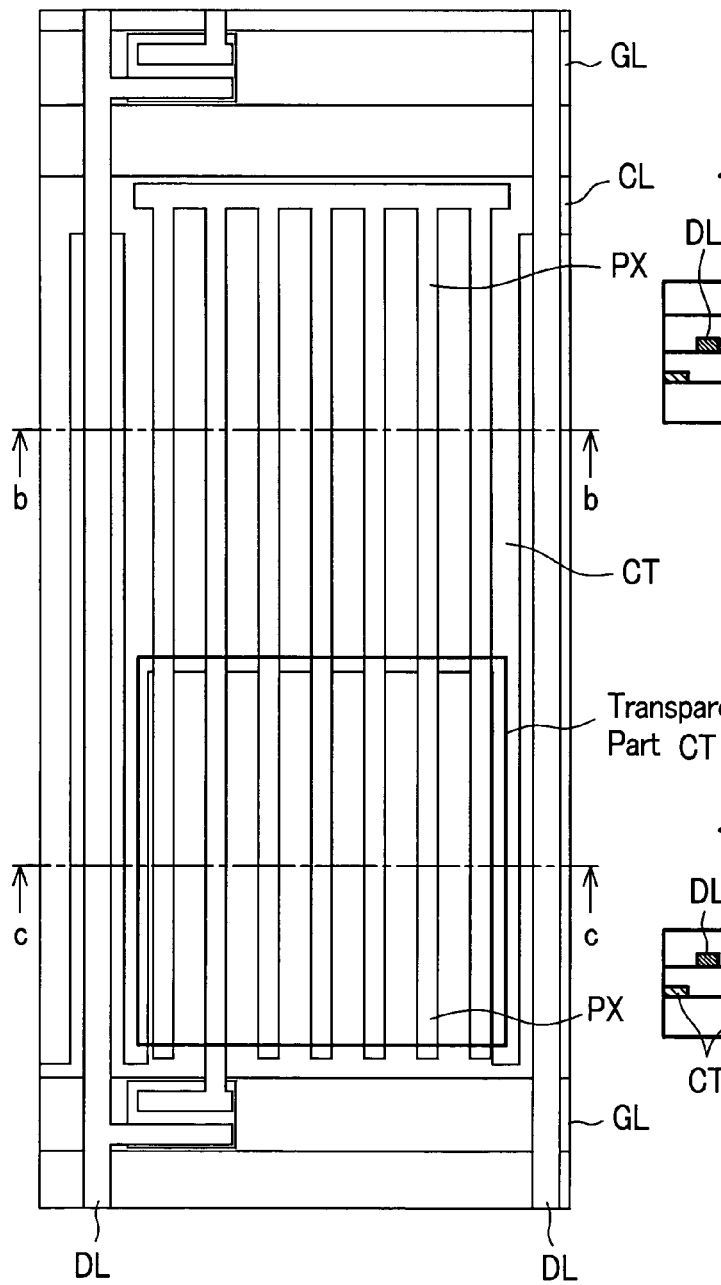
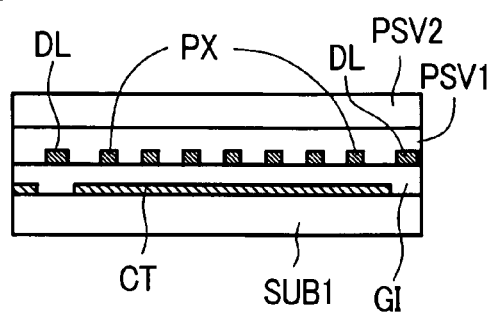
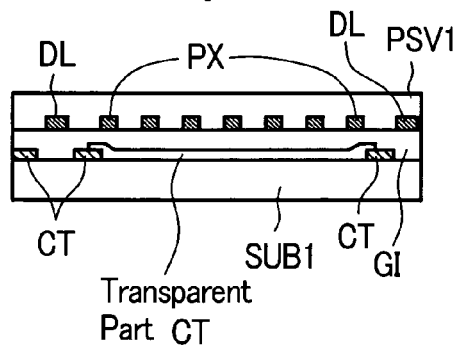

DISPLAY DEVICE

TECHNICAL FIELD

The present invention relates to a display device, and more particularly to a liquid crystal display device.

BACKGROUND OF THE INVENTION

A liquid crystal display device referred to as a lateral electric field system is configured such that on a pixel region formed on a liquid-crystal-side surface of one substrate out of respective substrates which are arranged to face each other with liquid crystal therebetween, pixel electrodes and counter electrodes which generate an electric field between the counter electrodes and the pixel electrodes are formed, and the liquid crystal is activated due to components of the electric field substantially parallel to the substrate.

Further, in applying such a constitution to an active-matrix-type liquid crystal display device, first of all, on the liquid-crystal-side surface of the above-mentioned one substrate, respective regions which are surrounded by a plurality of gate signal lines which are arranged in parallel to each other and a plurality of drain signal lines which are arranged in parallel to each other in a state that drain signal lines intersect the gate signal lines are formed and these regions constitute the above-mentioned pixel regions.

Further, each pixel region includes a thin film transistor which is operated in response to a scanning signal from the gate signal line, the above-mentioned pixel electrode to which a video signal is supplied from the drain signal line through the thin film transistor, and the above-mentioned counter electrode to which a signal which becomes the reference with respect to the video signal is supplied.

Here, the pixel electrode and the counter electrode are respectively formed in a strip pattern which extends in one direction, wherein the respective electrodes are formed of two or more electrodes and these electrodes are usually arranged alternately. One example of such a constitution is disclosed in U.S. Pat. No. 6,462,799.

Further, as a modification of the example, there has been known the constitution in which one electrode out of the pixel electrode and the counter electrode is formed in a planar shape and another electrode is formed in a linear shape, and another electrode is overlapped to one electrode by way of an insulation film. One example of the modification is disclosed in U.S. Pat. No. 6,233,034.

DISCLOSURE OF THE INVENTION

The liquid crystal display device having such a constitution has a characteristic to allow a viewer to clearly observe a display from the direction which makes a large angle with respect to the vertical direction of a display screen, that is, an excellent characteristic in a wide viewing angle. However, the improvement of the high-speed responsiveness has been also requested with respect to the liquid crystal display device.

The present invention has been made under such circumstances and it is an object of the present invention to provide a liquid crystal display device which exhibits a wide viewing angle characteristic and a high-speed responsiveness.

Further, it is another object of the present invention to provide a display device of a wide viewing angle and a high quality which includes both of a transmissive region and a reflective region.

To briefly explain typical inventions among inventions disclosed in this application, they are as follows.

(1) A liquid crystal display device is, for example, characterized in that on a liquid-crystal-side surface of one substrate out of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region, the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode, the pixel region is constituted of divided respective regions, wherein in one region, the counter electrode made of a light-transmitting material which is formed on the center except for a slight periphery of the region below an insulation film and the pixel electrode which is constituted of a group of electrodes which extend in one direction and are arranged in parallel to each other in the direction which intersects one direction above the insulation film in a state that the group of electrodes are overlapped to the counter electrode are formed, and in another region, the counter electrode which is constituted of a group of electrodes which extend in one direction and are arranged in parallel to each other in the direction which intersects one direction below the insulation layer and the pixel electrode which is constituted of a group of electrodes which extend in one direction and are arranged in parallel in the direction which intersects one direction above the insulation film and is arranged alternately with the counter electrode are formed.

(2) A liquid crystal display device according to the present invention is, for example, characterized in that on a liquid-crystal-side surface of one substrate out of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region, the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode, the pixel region is constituted of divided respective regions, wherein in one region, the pixel electrode made of a light-transmitting material which is formed on the center except for a slight periphery of the region below an insulation film and the counter electrode which is constituted of a group of electrodes which extend in one direction and are arranged in parallel to each other in the direction which intersects one direction above the insulation film in a state that the group of electrodes are overlapped to the pixel electrode are formed, in another region, the pixel electrode which is constituted of a group of electrodes which extend in one direction and are arranged in parallel to each other in the direction which intersects one direction below the insulation film and the counter electrode which is constituted of a group of electrodes which extend in one direction and are arranged in parallel in the direction which intersects one direction above the insulation film and is arranged alternately with the pixel electrode are formed, and each counter electrode in each region is formed in a state that the counter electrode covers the drain signal line.

(3) The liquid crystal display device according to the present invention is, for example, on the premise of the constitution (2), characterized in that the respective insulation films formed in the respective regions are formed of a sequentially stacked body which is constituted of a protective film made of an inorganic material and a protective film made of an organic material, and the respective counter electrodes are formed of a light transmitting material.

(4) A liquid crystal display device is, for example, characterized in that on a liquid-crystal-side surface of one substrate out of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region, the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode, the pixel region is constituted of divided respective regions, wherein in one region, the counter electrode which is formed on the center except for a slight periphery of the region below an insulation film and also functions as a reflective electrode and the pixel electrode which is constituted of a group of electrodes which extend in one direction and are arranged in parallel to each other in the direction which intersects one direction above the insulation film in a state that the group of electrodes are overlapped to the counter electrode are formed, and in another region, the counter electrode which is constituted of a group of electrodes which extend in one direction and are arranged in parallel to each other in the direction which intersects one direction below the insulation layer and the pixel electrode which is constituted of a group of electrodes which extend in one direction and are arranged in parallel in the direction which intersects one direction above the insulation film and is arranged alternately with the counter electrode are formed.

(5) A liquid crystal display device is, for example, characterized in that on a liquid-crystal-side surface of one substrate out of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region, the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode, the pixel region is constituted of divided respective regions, wherein in one region, the counter electrode which is formed on the center except for a slight periphery of the region below an insulation film and also functions as a reflective electrode and the pixel electrode which is constituted of a group of electrodes which extend in one direction and are arranged in parallel to each other in the direction which intersects one direction above the insulation layer in a state that the group of electrodes are overlapped to the counter electrode are formed, in another region, the counter electrode which is constituted of a group of electrodes which extend in one direction and are arranged in parallel to each other in the direction which intersects one direction below the insulation layer and the pixel electrode which is constituted of a group of electrodes which extend in one direction and are arranged in parallel in the direction which intersects one direction above the insulation film and is arranged alternately with the counter electrode are formed, and the insulation film has a larger thickness in another region than one region such that a film thickness of a liquid crystal layer in one region is approximately three times as large as a film thickness of a liquid crystal layer in another region.

(6) A liquid crystal display device according to the present invention is, for example, on the premise of the constitution (5), characterized in that the insulation film in one region is formed of a protective film made of an inorganic material, the insulation film in another region is formed of a sequentially stacked body consisting of a protective film made of an inorganic material and a protective film made of an organic material, and at the same time, the counter electrode includes at least a counter electrode which covers the drain signal line.

(7) A liquid crystal display device is, for example, characterized in that on a liquid-crystal-side surface of one substrate out of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region, the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode, the pixel region is constituted of divided respective regions, wherein in one region, the counter electrode which is formed on the center except for a slight periphery of the region below an insulation film and also functions as a reflective electrode and the pixel electrode which is constituted of a group of electrodes which extend in one direction and are arranged in parallel to each other in the direction which intersects one direction above the insulation layer in a state that the group of electrodes are overlapped to the counter electrode are formed, in another region, the counter electrode which is constituted of a group of electrodes which extend in one direction and are arranged in parallel to each other in the direction which intersects one direction below the insulation layer and the pixel electrode which is constituted of a group of electrodes which extend in one direction and are arranged in parallel in the direction which intersects one direction above the insulation film and is arranged alternately with the counter electrode, and the insulation film has a layer thickness thereof in one region than the layer thickness in another region.

(8) A liquid crystal display device according to the present invention is, for example, on the premise of the constitution (7), characterized in that the insulation film in another region is formed of a protective film made of an inorganic material, and the insulation film in one region is formed of a sequentially stacked body consisting of a protective film made of an inorganic material and a protective film made of an organic material.

(9) A display device according to the present invention is, for example, characterized in that on one substrate out of a pair of substrates which are arranged to face each other with liquid crystal therebetween, pixel electrodes and counter electrodes are formed, wherein the display device includes transmissive regions and reflective regions, and a distance from the substrate to an uppermost layer electrode is set larger in the transmissive regions than in the reflective regions, and a planar distance between the uppermost layer electrodes is set larger in the transmissive regions than in the reflective region.

(10) A display device according to the present invention is, for example, on the premise of the constitution (9), characterized in that the display device includes a counter electrode made of a transparent conductor which extends between the transmissive region and the reflective region, the display device includes a counter electrode made of metal which is formed in the reflective region, and the display device includes a pixel electrode formed of a transparent electrode which is formed on an uppermost layer and is spaced apart from the counter electrode by way of an insulation film.

(11) A display device according to the present invention is, for example, on the premise of the constitution (9), characterized in that the display device includes a pixel electrode made of a transparent conductor which extends between the transmissive region and the reflective region, the display device includes a pixel electrode made of metal which is formed in the reflective region, and the display device includes a counter electrode formed of a transparent electrode which is formed on an uppermost layer and is spaced apart from the counter electrode by way of an insulation film.

(12) A display device according to the present invention is, for example, on the premise of the constitution (9), characterized in that a boundary between the transmissive region and the reflective region exists in the inside of the display region.

(13) A display device according to the present invention is, for example, on the premise of the constitution (12), characterized in that the initial orientation direction is substantially parallel to the extending direction of the boundary between the transmissive region and the reflective region.

(14) A display device according to the present invention is, for example, on the premise of the constitution (12), characterized in that the boundary between the transmissive region and the reflective region is covered with the uppermost layer electrode thus providing a normally black mode.

(15) A display device according to the present invention is, for example, on the premise of the constitution (14), characterized in that the uppermost layer electrode which covers the boundary between the transmissive region and the reflective region sets a transmissive-region-side width thereof larger than a reflective-region-side width thereof.

(16) A display device according to the present invention is, for example, on the premise of the constitution (15), characterized in that the uppermost layer electrode which covers the boundary between the transmissive region and the reflective region sets the width thereof larger than a sum of a distance between the uppermost layer electrodes in the transmissive region and a distance between the uppermost electrodes in the reflective region.

(17) A display device according to the present invention is, for example, on the premise of the constitution (15), characterized in that the uppermost layer electrode which covers the boundary between the transmissive region and the reflective region sets the transmissive-region-side width thereof larger than a distance between the electrodes in the transmissive region and sets the reflective-region-side width thereof larger than a distance between the electrodes in the reflective region.

(18) A display device according to the present invention is, for example, characterized in that on one substrate out of a pair of substrates which are arranged to face each other with liquid crystal therebetween, pixel electrodes and counter electrodes are formed, wherein each pixel includes a first region in which both of the pixel electrode and the counter electrode extend in parallel linearly, and a second region in which one electrode out of the pixel electrode and the counter electrode is formed linearly, and another electrode is formed in a planner shape and is overlapped to one electrode by way of an insulation film.

(19) A display device according to the present invention is, for example, on the premise of the constitution (18), characterized in that a distance between the linear electrodes differ between the first region and the second region.

(20) A display device according to the present invention is, for example, on the premise of the constitution (19), characterized in that the distance between the electrodes is set larger in the first region than in the second region. According to the present invention, it is possible to obtain a display device which exhibits excellent wide viewing angle characteristic and high-speed responsiveness.

Here, the present invention is not limited to the abovementioned constitutions and various modifications can be made without departing from a technical concept of the present invention.

BRIEF EXPLANATION OF DRAWINGS

FIG. 3 is a constitutional view showing another embodiment of the pixel of the liquid crystal display device according to the present invention.

FIG. 17 is a constitutional view showing another embodiment of the pixel of the liquid crystal display device according to the present invention.

BEST MODE FOR CARRYING OUT THE INVENTION

Hereinafter, a mode for carrying out a liquid crystal display device according to the present invention is explained in conjunction with following embodiments by reference to drawings.

Embodiment 1

Whole Constitution

Figure 2:
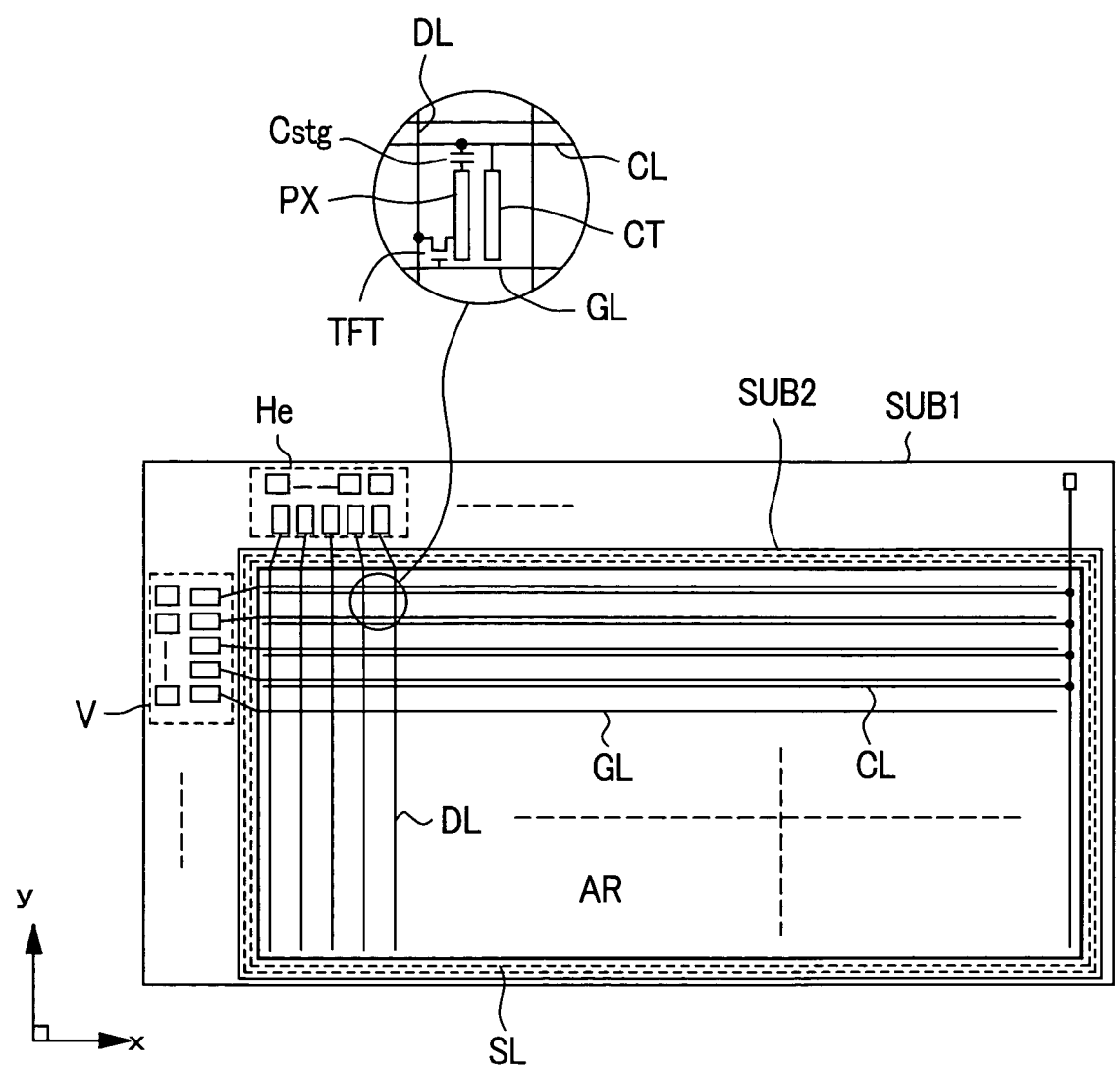
FIG. 2 is a constitutional view showing one embodiment of the liquid crystal display device according to the present invention.

FIG. 2 is a constitutional view showing one embodiment of the liquid crystal display device according to the present invention. Although the drawing is shown as an equivalent circuit, the drawing is depicted corresponding to an actual geometrical arrangement.

The liquid crystal display device includes a pair of transparent substrates SUB 1, SUB 2 which are arranged to face each other with liquid crystal there between, wherein the liquid crystal is sealed by a sealing material SL which also performs a function of fixing another transparent substrate SUB 2 to one transparent substrate SUB 1.

On a liquid-crystal-side surface of the above-mentioned one transparent substrate SUB 1, which is surrounded by the sealing material SL, gate signal lines GL which extend in the x direction and are arranged in parallel in the y direction and drain signal lines DL which extend in the y direction and are arranged in parallel in the x direction are formed.

Regions which are surrounded by the respective gate signal lines GL and the respective drain signal lines DL constitute pixel regions and, at the same time, a mass of these respective pixel regions arranged in a matrix array constitutes a liquid crystal display part AR.

Further, in each one of the respective pixel regions which are arranged in parallel in the x direction, a common counter voltage signal line CL which runs in the inside of the respective pixel regions is formed. The counter voltage signal line CL constitutes a signal line for supplying a voltage which becomes the reference with respect to a video signal to counter electrodes CT described later of the respective pixel regions.

In each pixel region, a thin film transistor TFT which is operated in response to the scanning signal from the one-side gate signal line GL and a pixel electrode PX to which the video signal from the one-side drain signal line DL is supplied through the thin film transistor TFT are formed.

The pixel electrode PX generates an electric field between the pixel electrode PX and the counter electrode CT which is connected to the counter voltage signal line CL and a light transmissivity of the liquid crystal is controlled based on the electric field.

Respective one ends of the gate signal lines GL extend over the sealing material SL and extending ends constitute terminals to which output terminals of a vertical scanning drive circuit V are connected. Further, to input terminals of the vertical scanning drive circuit V, signals from a printed circuit board which is arranged outside a liquid crystal display panel are inputted.

The vertical scanning drive circuit V is constituted of a plurality of semiconductor devices, wherein a plurality of gate signal lines which are arranged close to each other are formed into a group and one semiconductor device is allocated to each group.

In the same manner, respective one ends of the drain signal lines DL extend over the sealing material SL and extending ends constitute terminals to which output terminals of a video signal drive circuit He are connected. Further, to input terminals of the video signal drive circuit He, signals from a printed circuit board which is arranged outside a liquid crystal display panel are inputted.

The video signal drive circuit He is also constituted of a plurality of semiconductor devices, wherein a plurality of drain signal lines which are arranged close to each other are formed into a group and one semiconductor device is allocated to each group.

Further, the above-mentioned counter voltage signal lines CL each of which is used in common in the respective pixel regions arranged in parallel in the x direction are connected in common at a right-side end portion in the drawing, the connection line extends over the sealing material SL, and a terminal CLT is formed at the extending end. From the terminal CLT, a voltage which becomes the reference with respect to the video signal is supplied.

With respect to the respective gate signal lines GL, one gate signal line GL is sequentially selected in response to the scanning signal from the vertical scanning circuit V.

Further, to the respective drain signal lines DL, the video signal is supplied from the video signal drive circuit He in conformity with the selection timing of the gate signal lines GL.

Here, in the above-mentioned embodiment, the vertical scanning drive circuit V and the video signal drive circuit He are formed of semiconductor devices which are mounted on the transparent substrate SUB 1. However, the vertical scanning drive circuit V and the video signal drive circuit He may be formed of so-called tape-carrier method semiconductor devices which are connected while striding over the transparent substrate SUB 1 and the printed circuit board, for example. Further, when a semiconductor layer of the above-mentioned thin film transistor TFT is constituted of poly-crystal silicon (p-Si), semiconductor elements made of the above-mentioned crystal silicon may be formed together with a wiring layer on a surface of the transparent substrate SUB 1.

<<Constitution of Pixel>>

Figure 1A:
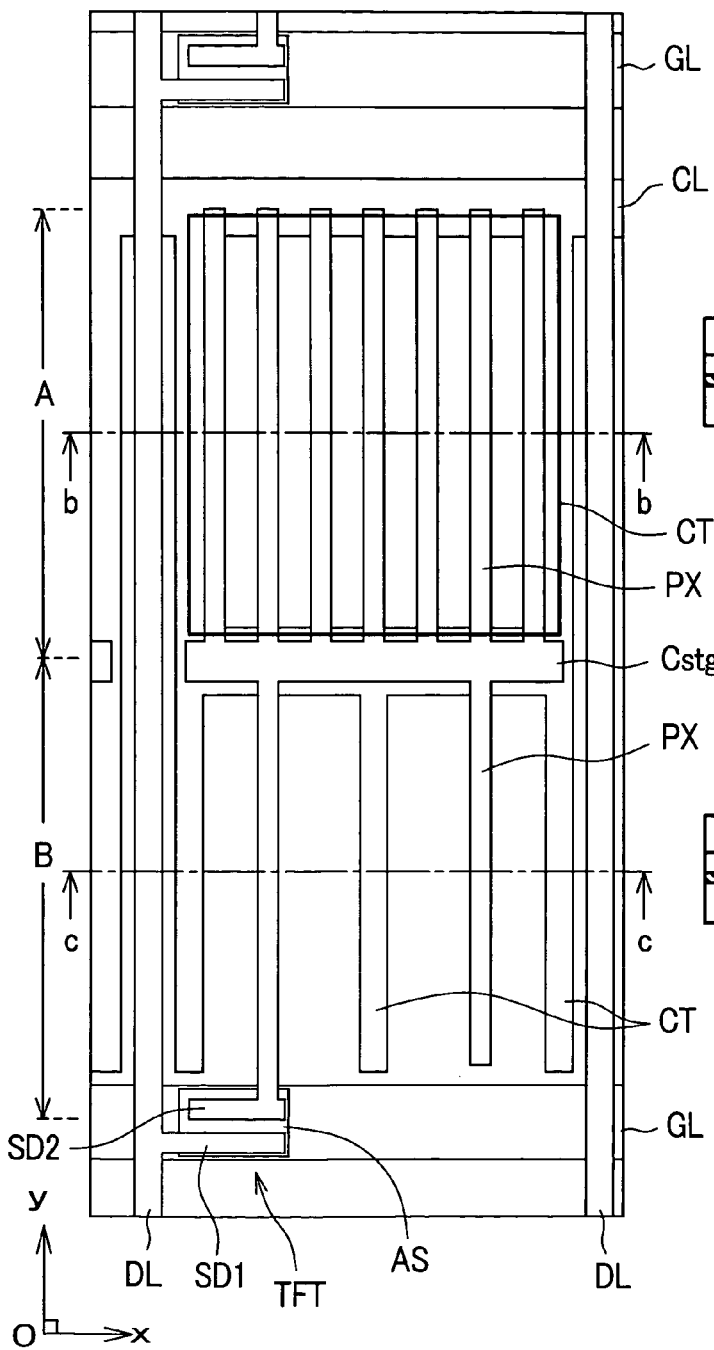
FIG. 1 is a constitutional view showing one embodiment of a pixel of a liquid crystal display device according to the present invention.
Figure 1B:
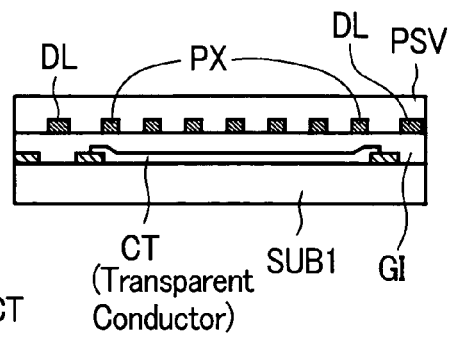
Figure 1C:
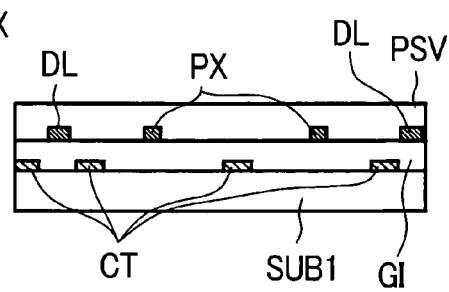

FIG. 1(a) is a plan view showing one embodiment of the constitution of the above-mentioned pixel region further, a cross section taken along a line b-b in FIG. 1(a) is shown in FIG. 1(b) and a cross section taken along a line c-c in FIG. 1(a) is shown in FIG. 1(c).

In the respective drawings, on a liquid-crystal-side surface of the transparent substrate SUB 1, first of all, a pair of gate signal lines GL which extend in the x direction and are arranged in parallel in the y direction are formed.

These gate signal lines GL surround a rectangular region together with a pair of drain signal lines DL described later, wherein the region is constituted as a pixel region.

Further, the pixel region is divided into two regions (an upper region in the drawing being referred to as a region A and a lower region in the drawing being referred to as a region B) which are defined by an imaginary line which runs in the x direction in the drawing at a substantially center of the pixel region.

Further, the counter voltage signal line CL is formed in parallel to the gate signal line GL, wherein the counter voltage signal line CL is positioned at an upper portion on the region A side of the pixel region, for example.

Further, the counter voltage signal lines CL are formed in a pattern in which the counter voltage signal lines CL are formed in the inside of the pixel region in a state that the counter voltage signal lines CL are arranged close to the drain signal lines DL described later and extend along the drain signal lines DL and, at the same time, the counter voltage signal lines CL are connected with each other in an upper portion of the region B of the pixel region.

That is, the counter voltage signal line CL is integrally formed at four sides in the region A of the pixel region and at three sides except for a lower-side portion in the region B.

Further, for example, one counter electrode CT which extends in the y direction in the drawing at the substantially center of the region B of the pixel region is integrally formed with the counter voltage signal line CL.

In the region B, the counter voltage signal line CL which is arranged close to the drain signal line DL also functions as the counter electrode CT thus forming three counter electrodes CT in total including the above-mentioned counter electrode CT.

Further, in the region A of the pixel region, a light-transmitting conductive film made of, for example, ITO (Indium Tin Oxide), ITZO (Indium Tin Zinc Oxide), IZO (Indium Zinc Oxide) or the like is formed, and four respective sides of the conductive film are overlapped to the counter voltage signal line CL thus electrically connecting the conductive film with the counter voltage signal line CL.

The light transmitting conductive film is configured to function as a counter electrode CT in the region A.

On a surface of the transparent substrate SUB 1 on which the gate signal lines GL and the counter voltage signal lines CL (counter electrodes CT) are formed in this manner, an insulation film GI which is made of SiN, for example, is formed in a state that the insulation film GI also covers the gate signal lines GL and the counter voltage signal lines CL (counter electrodes).

The insulation film GI has a function of an interlayer insulation film with respect to the gate signal line GL and the counter voltage signal line CL in the region where the drain signal line DL described later is formed, a function of a gate insulation film with respect to the region where the thin film transistor TFT described later is formed and a function of a dielectric film in a region where a capacitive element Cstg described later is formed.

Further, on a surface of the insulation film GI, a semiconductor layer AS made of, for example, amorphous Si is formed in a state that the semiconductor layer AS is overlapped to a portion of the gate signal line GL.

The semiconductor layer AS constitutes a semiconductor layer of the thin film transistor TFT, wherein by forming a drain electrode SD1 and a source electrode SD2 on an upper surface of the thin film transistor TFT, it is possible to constitute an MIS type transistor having the inversely-staggered structure which uses the portion of the gate signal line GL as a gate electrode.

Here, the above-mentioned drain electrode SD1 and the source electrode SD2 are formed simultaneously at the time of forming the drain signal line DL.

That is, the drain signal lines DL which extend in the y direction and are arranged in parallel in the x direction are formed, portions of the drain signal lines DL are extended to upper surfaces of the semiconductor layers AS thus forming the drain electrodes SD1, and the source electrodes SD2 are formed in a spaced-apart manner from the drain electrodes SD1 by an amount corresponding to a channel length of the thin film transistor TFT.

The source electrode SD2 is extended from a surface of the semiconductor layer AS to an upper surface of the pixel-region-side insulation film GI and the pixel electrode PX is integrally formed with the source electrode SD2.

First of all, with respect to the pixel electrodes PX in the region B, two pixel electrodes PX are formed in a state that each pixel electrode PX is extended in the y direction and is arranged between the respective counter electrodes CT, and the pixel electrodes PX are connected with each other on the counter voltage signal line CL which is formed on a boundary between the region B and the region A.

Due to such a constitution, in the region B of the pixel region, the counter electrodes CT and the pixel electrodes PX are alternately formed, that is, in order of the counter electrode CT, the pixel electrode PX, the counter electrode CT, the pixel electrode PX, the counter electrode CT from one drain signal line DL side.

Further, with respect to the pixel electrode PX in the region A, the pixel electrode PX is formed of a group of electrodes consisting of a plurality of electrodes which extend in the y direction and are arranged in parallel in the x direction in a state that the group of electrodes is overlapped to the counter electrode CT in the region, and the respective electrodes are integrally connected with each other on the counter voltage signal line CL which is formed on the boundary between the region A and the region B.

The number of pixel electrodes PX in the region A is set larger than the number of pixel electrodes PX in the region B. This is because that in the region A, the pixel electrodes PX generate an electric field in a concentrated manner between side portions (edge portions) of the pixel electrodes PX and the counter electrode CT.

On the counter voltage signal line CL, a connecting portion of each pixel electrode PX has a relatively large area and a capacitive element Cstg which uses the above-mentioned insulation film GI as a dielectric film is formed between the pixel electrode PX and the counter voltage signal line CL at such a portion.

The capacitive element Cstg is configured to possess functions such as a function of storing the video signal supplied to the pixel electrode PX for a relatively long time and the like, for example.

On the surface of the transparent substrate SUB 1 on which the thin film transistors TFT, the drain signal lines DL, the drain electrodes SD1, the source electrodes SD2 and the pixel electrodes PX are formed in this manner, a protective film PSV made of SiN, for example, is formed. The protective film PSV is a film which prevents the thin film transistors TFT from directly coming into contact with the liquid crystal and is provided for preventing the deterioration of the characteristic of the thin film transistor TFT.

Here, the above-mentioned protective film PSV may be, for example, formed of an organic material layer made of resin or a stacked body which is constituted of an inorganic material layer and the organic material layer. By adopting such a constitution, a surface of the protective film PSV can be leveled and hence, it is possible to favorably improve the rubbing property of an orientation film formed on the protective film PSV.

Further, the orientation film (not shown in the drawing) is formed on an upper surface of the protective film PSV.

The orientation film is a film which is brought into direct contact with the liquid crystal and determines the initial orientation direction of molecules of the liquid crystal by rubbing formed on the surface of the orientation film.

The liquid crystal display device having such a constitution includes the region A and the region B in each pixel region, wherein in the region A, right below the pixel electrodes PX by way of the insulation film GI, an electric field is generated between the pixel electrodes PX and the counter electrode CT including peripheries of the pixel electrodes PX. In this case, a distance between the pixel electrodes PX and the counter electrode CT is set to an amount substantially corresponding to a thickness of the insulation film GI and hence, it is possible to form the electric field having a relatively large intensity whereby the high-speed responsiveness can be enhanced.

Here, the electric field which drives the liquid crystal is constituted of a component substantially parallel to the transparent substrate SUB 1 out of the electric field generated between the above-mentioned pixel electrode PX and counter electrode CT. Accordingly, in this region A, the distance between each pixel electrode PX and the neighboring pixel electrode PX is made relatively narrow thus increasing the electric field of the component substantially parallel to the transparent substrate SUB 1 between the pixel electrode PX and the counter electrode CT. Accordingly, the number of pixel electrodes PX formed in the region A is set larger than the number of pixel electrodes PX formed in the region B.

On the other hand, in the pixel region B, the pixel electrodes PX and the counter electrodes CT are alternately arranged by way of the above-mentioned insulation film GI and the spaced-apart distance between the pixel electrode PX and the counter electrode CT is relatively large and hence, the electric field generated between the pixel electrode PX and the counter electrode CT contains a larger amount of component substantially parallel to the transparent substrate SUB 1. This implies that the liquid crystal display device can possess the excellent wide-viewing-angle characteristic due to the nature of the behavior of the above-mentioned component of the liquid crystal.

In this manner, by controlling the number of electrodes in the regions A and B, it is possible to allow the wide viewing angle, the high-speed responsiveness and the high numerical aperture compatible with each other.

Accordingly, the liquid crystal display device having such a constitution can perform an image display which includes both of the wide viewing angle characteristic and the high-speed responsiveness.

Embodiment 2

FIG. 3 is a constitutional view showing another embodiment of the liquid crystal display device according to the present invention and corresponds to FIG. 1.

The constitution which makes this embodiment different from the embodiment shown in FIG. 1 lies in that the pixel electrodes PX are formed on an upper surface of the protective film PSV in the region A of the pixel region.

In this case, the pixel PX electrodes are connected with each other in common above the counter voltage signal line CL which runs at the center of the pixel region in the x direction, and a portion of the connecting portion is electrically connected with the counter voltage signal line CL via a through hole TH formed in the protective film PSV and the insulation film GI in a penetrating manner.

Further, it is needless to say that the pixel electrodes PX may be formed of a non-light-transmitting material such as metal or a light transmitting material such as ITO or the like.

By adopting such a constitution, the liquid crystal display device can obtain the wide viewing angle characteristic and the high-speed responsiveness.

Embodiment 3

Figure 4A:
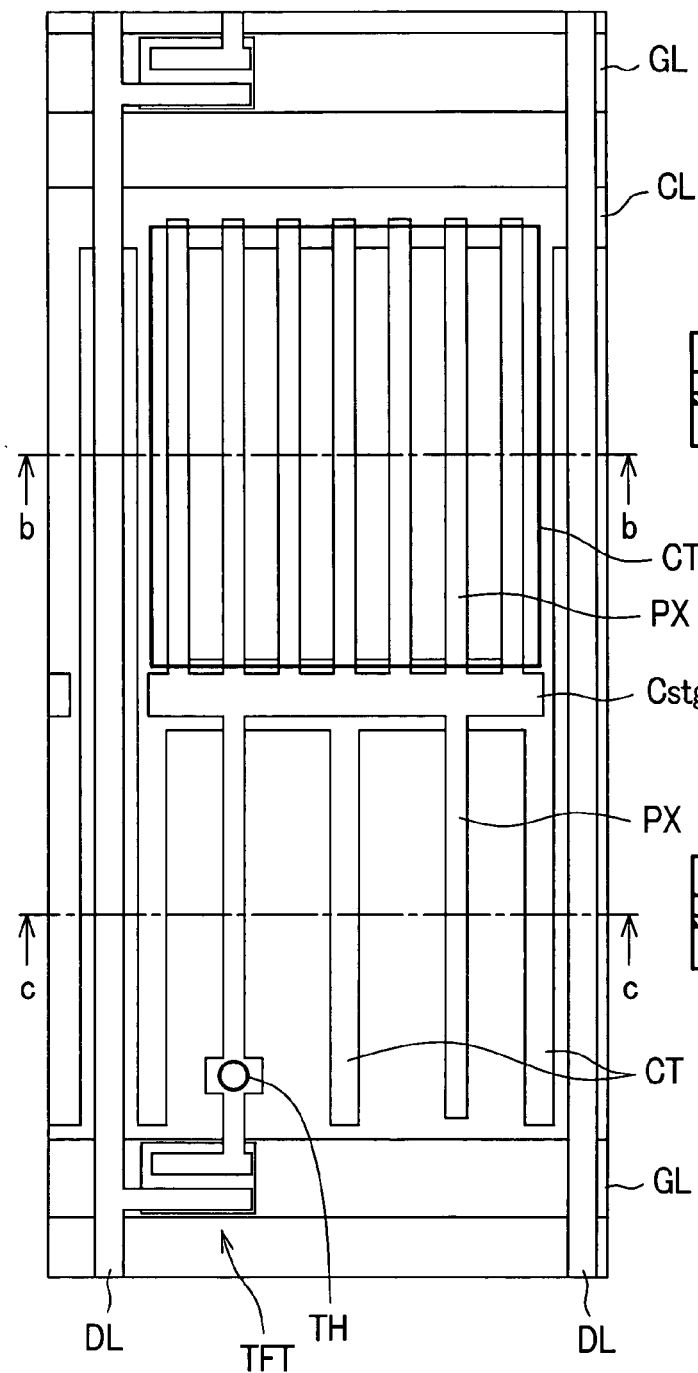
FIG. 4 is a constitutional view showing another embodiment of the pixel of the liquid crystal display device according to the present invention.
Figure 4B:
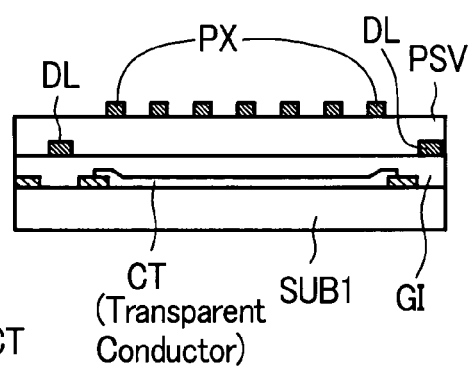
Figure 4C:
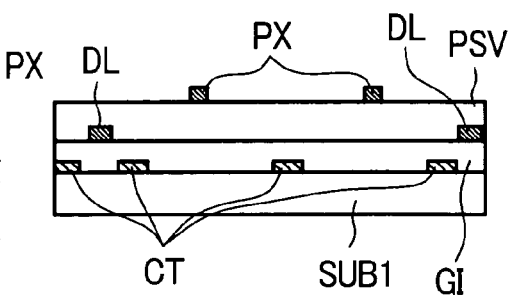

FIG. 4 is a constitutional view showing another embodiment of the liquid crystal display device according to the present invention and corresponds to FIG. 1.

The constitution which makes this embodiment different from the embodiment shown in FIG. 1 lies in that in the region A and the region B of the pixel region, the respective pixel electrodes PX are formed on an upper surface of the protective film PSV.

Due to such a constitution, the pixel electrodes PX the number of which differs largely between the regions, and are liable to easily produce etching residues can be formed on an uppermost layer and hence, it is possible to reduce short-circuiting failures between the pixel electrodes PX and other conductive layers such as the drain signal lines DL, the counter electrodes CT or the like.

In this case, one end of the pixel electrode PX which is arranged close to the thin film transistor TFT is electrically connected with the source electrode of the thin film transistor TFT via the through hole TH formed in the protective film PSV and the insulation film GI in a penetrating manner.

Further, it is needless to say that the pixel electrodes PX may be formed of a non-light-transmitting material such as metal or a light transmitting material such as ITO or the like.

By adopting such a constitution, the liquid crystal display device can obtain the wide viewing angle characteristic and the high-speed responsiveness.

Embodiment 4

Figure 5A:
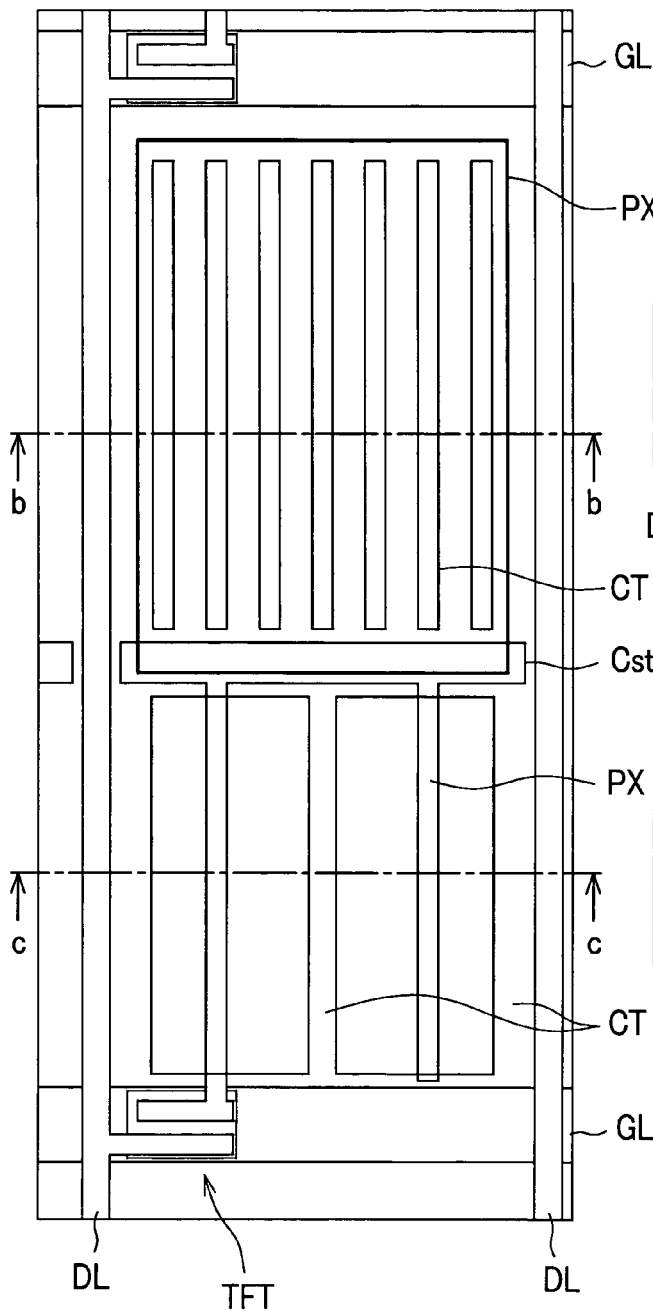
FIG. 5 is a constitutional view showing another embodiment of the pixel of the liquid crystal display device according to the present invention.
Figure 5B:
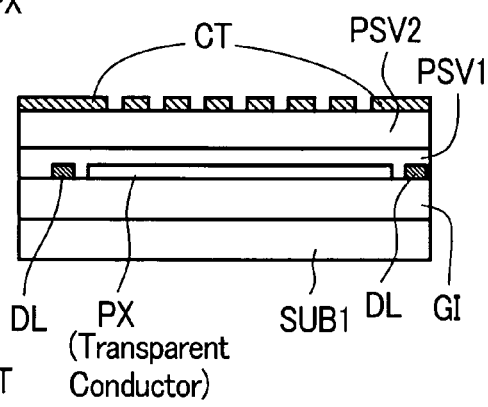
Figure 5C:
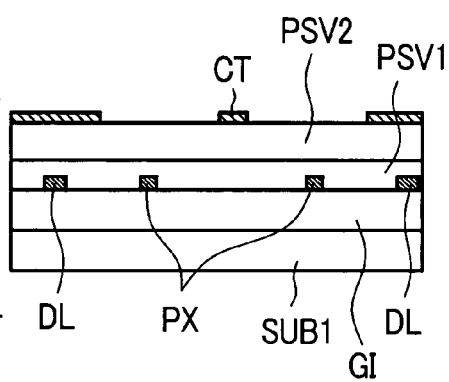

FIG. 5 is a constitutional view showing another embodiment of the liquid crystal display device according to the present invention and corresponds to FIG. 1.

The constitution which makes this embodiment different from the embodiment shown in FIG. 1 lies in that, first of all, the pixel electrodes PX are formed on an upper surface of the insulation film GI and the counter electrodes CT are formed on an upper surface of the protective film PSV.

That is, the pixel electrodes PX in the region B are integrally formed with the source electrode D2 of the thin film transistor TFT and an electric connection between the pixel electrode PX and the source electrode SD2 is established in the boundary portion between the region B and the region A. The pixel electrode PX in the region A is formed in a rectangular shape at a center portion of the region A except for a slight periphery of the region A, and the pixel electrode PX is formed of a light-transmitting conductive layer made of ITO or the like, for example.

The protective film PSV is constituted of, for example, a sequentially stacked body of a protective film PSV1 made of an inorganic material such as SiN or the like and a protective film PSV2 made of an organic material such as a resin.

The counter electrodes CT in the pixel region B are formed in a state that each pixel electrode PX is arranged between the counter electrodes CT, while the counter electrode CT in the region A is constituted of a group of electrodes formed of a large number of electrodes which extend in the y direction and are arranged in parallel in the x direction in a state that the counter electrode CT is overlapped to the pixel electrode PX.

Further, these respective counter electrodes CT are integrally formed with the same material layer which is formed at a portion which covers the gate signal line GL, at a portion which covers the drain signal line DL and at a portion which defines the region A and the region B.

Here, the above-mentioned material layer which covers the drain signal line DL has a function of the counter electrode CT in the same manner as the above-mentioned counter electrode CT and, at the same time, avoids the termination of lines of electric forces generated by an electric field from the drain signal line DL to the neighboring pixel electrode PX by terminating the lines of electric forces. This is because that the termination of the lines of electric forces to the pixel electrode PX adversely influences a display as noises.

Accordingly, the above-mentioned material layer which covers the drain signal line DL has a center axis thereof substantially aligned with a center axis of the drain signal line and has a width thereof set larger than a width of the drain signal line.

Further, it is needless to say that the above-mentioned counter electrodes CT may be formed of a non-light-transmitting material such as metal or a light transmitting material such as ITO or the like.

By adopting such a constitution, the liquid crystal display device can obtain the wide viewing angle characteristic and the high-speed responsiveness.

In this embodiment, by forming the counter electrodes CT on an uppermost layer, it is possible to form the counter electrodes CT integrally and in a matrix array in the regions A, B and hence, the electricity supply resistance can be reduced. Further, it is possible to optimize the counter electrode CT on the drain signal line DL for every region without influencing the numerical aperture and hence, the numerical aperture can be enhanced.

Embodiment 5

Figure 6A:
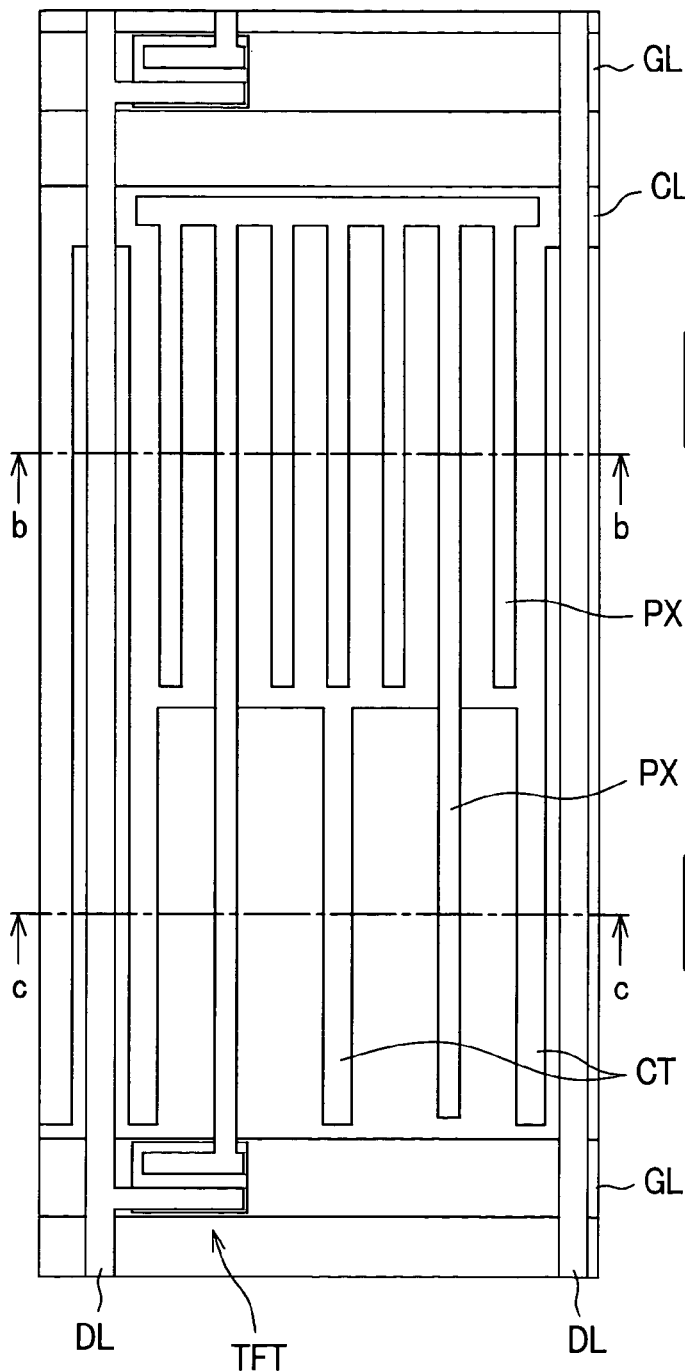
FIG. 6 is a constitutional view showing another embodiment of the pixel of the liquid crystal display device according to the present invention.
Figure 6B:
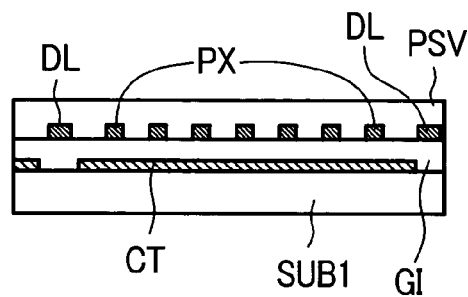
Figure 6C:
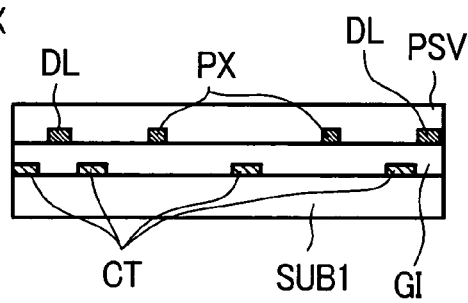

FIG. 6 is a constitutional view showing another embodiment of the liquid crystal display device according to the present invention and corresponds to FIG. 1.

The constitution which makes this embodiment different from the embodiment shown in FIG. 1 lies in that the counter electrode CT in the region A of the pixel region is replaced with a metal layer having a favorable light reflectance thus forming the region A into a light reflection portion of the pixel region. That is, the above-mentioned counter electrode CT is formed such that the counter electrode CT also functions as a reflective electrode.

Incidentally, the region B forms a light transmitting portion using the constitution substantially equal to the constitution shown in FIG. 1.

Here, the counter electrode CT in the region A may be integrally formed with the counter voltage signal line CL and this embodiment adopts such a constitution.

Further, in this embodiment, the respective pixel electrodes PX in the region A and the region B of the pixel region are formed of electrodes which are formed in a state that the electrodes are overlapped to the counter voltage signal line CL formed on the upper portion of the pixel region and extend to the region A from another electrode of the capacitive element Cstg, and electrodes which are formed in a state that the electrodes are overlapped to the counter voltage signal line CL which is formed on the upper portion of the pixel region and extend to the region B from another electrode of the capacitive element Cstg.

Further, it is needless to say that the above-mentioned pixel electrodes PX may be formed of a non-light-transmitting material such as metal or a light transmitting material such as ITO or the like.

By adopting such a constitution, the liquid crystal display device can obtain the wide viewing angle characteristic and the high-speed responsiveness.

In this embodiment, by forming the region A into the reflective region, it is possible to enhance both of the transmissivity and the reflectance compared to the case in which the region B is formed of the reflective region and hence, the present invention can simultaneously realize the high reflectance and the high numerical aperture which contradict to each other at a glance.

Embodiment 6

Figure 7A:
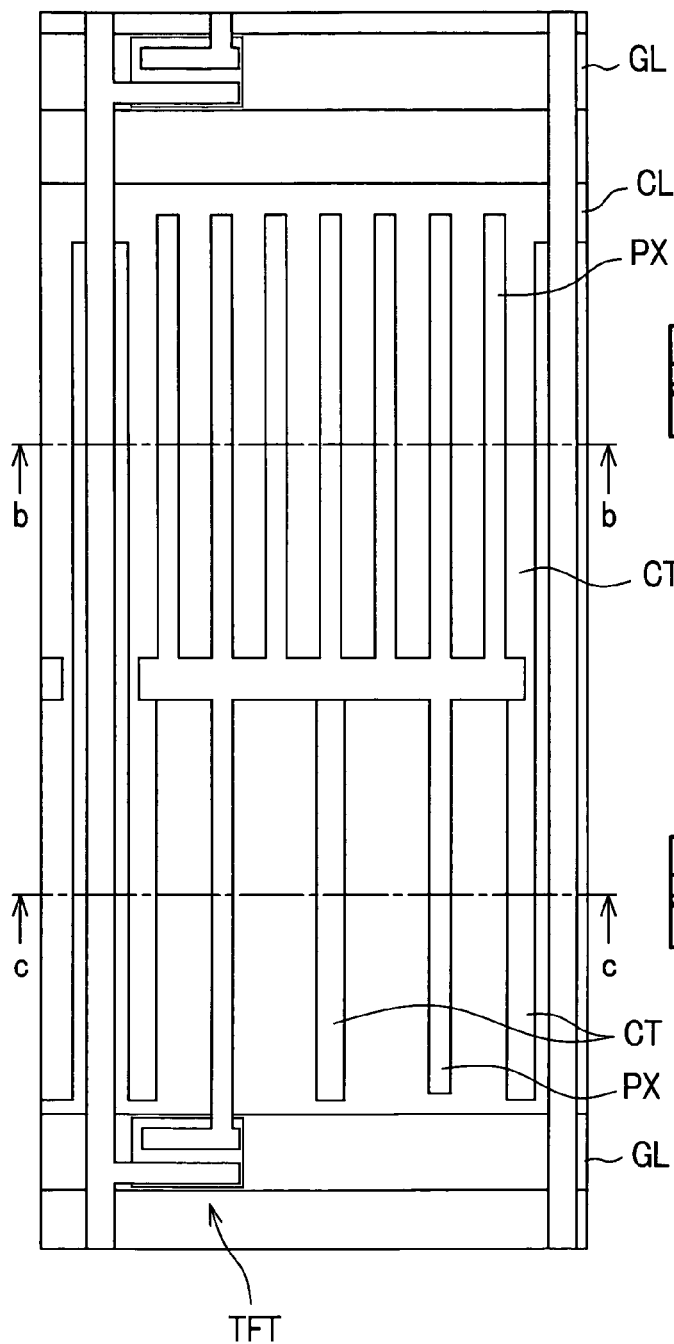
FIG. 7 is a constitutional view showing another embodiment of the pixel of the liquid crystal display device according to the present invention.
Figure 7B:
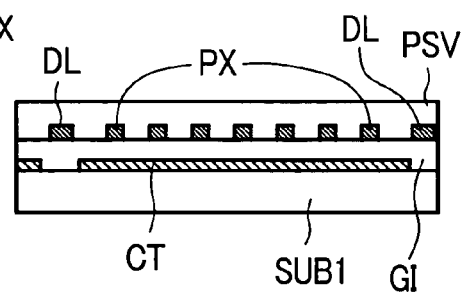
Figure 7C:
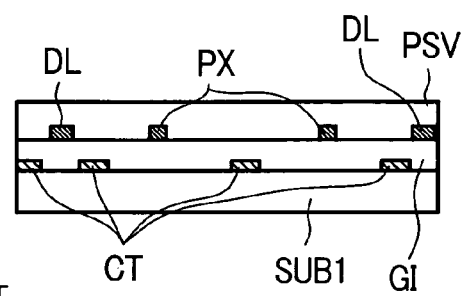

FIG. 7 is a constitutional view showing another embodiment of the liquid crystal display device according to the present invention and corresponds to FIG. 6.

The constitution which makes this embodiment different from the embodiment shown in FIG. 6 lies in that the pixel electrodes PX in the region A of the pixel region and the pixel electrodes PX in the region B of the pixel region are constituted of electrodes which are formed in a state that the electrodes extends to the region A from another electrode of the capacitive element Cstg formed on the counter voltage signal line CL formed on the boundary of the respective region in an overlapped manner and electrodes which extend to the region B from another electrode of the capacitive element Cstg.

Due to such a constitution, another electrode of the capacitive element Cstg is formed in a state that the capacitive element Cstg extends in the x direction at the substantially center of the pixel region and functions as a light shielding film. Accordingly, it is possible to eliminate the mixing of lights in the respective displays of the display region A and the display region B.

Further, it is needless to say that the above-mentioned pixel electrodes PX may be formed of a non-light-transmitting material such as metal or a light transmitting material such as ITO or the like.

By adopting such a constitution, the liquid crystal display device can obtain the wide viewing angle characteristic and the high-speed responsiveness.

Embodiment 7

Figure 8:
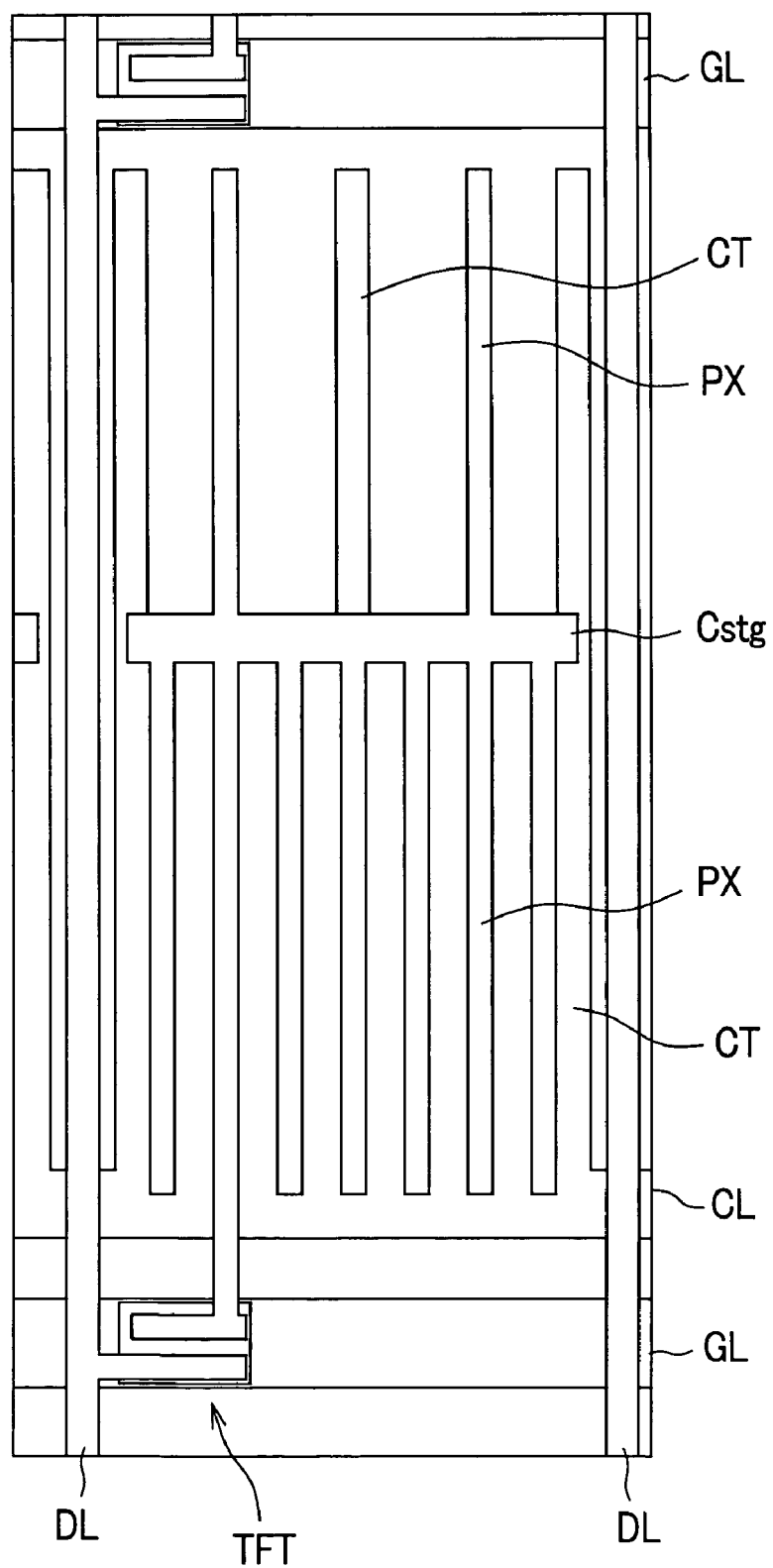
FIG. 8 is a plan view showing another embodiment of the pixel of the liquid crystal display device according to the present invention.

FIG. 8 is a constitutional view showing another embodiment of the liquid crystal display device according to the present invention and corresponds to FIG. 7.

The constitution which makes this embodiment different from the embodiment shown in FIG. 7 lies in that the region A which constitutes the light reflective portion and the region B which constitutes the light transmissive portion are formed in a reverse manner.

It is needless to say that such a constitution is also applicable to the embodiment 5.

In the region A having the large number of pixel electrodes PX, a generation ratio of etching residues between the pixel electrodes PX becomes relatively high compared to the generation ratio of etching residues between the pixel electrodes PX in the region B. Further, the structure in the vicinity of the thin film transistor TFT is complicated and hence, the etching residues are liable to be easily generated. However, in this embodiment, since the reflective region is arranged on the thin film transistor TFT side and hence, the residue generating portion constitutes a reflective portion whereby there is no possibility that the reflectance is lowered and it is possible to ensure the stable reflectance.

Embodiment 8

Figure 9A:
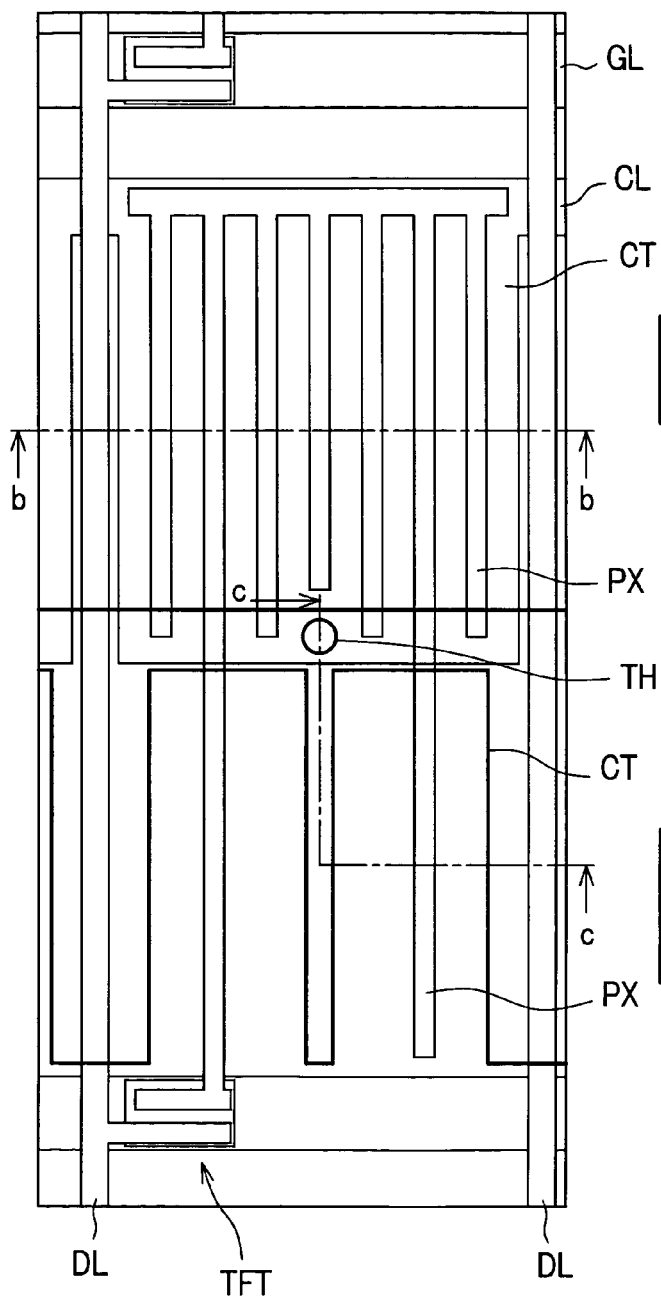
FIG. 9 is a constitutional view showing another embodiment of the pixel of the liquid crystal display device according to the present invention.
Figure 9B:
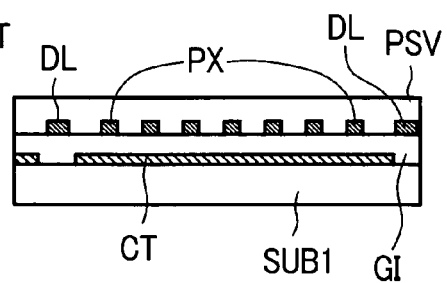
Figure 9C:
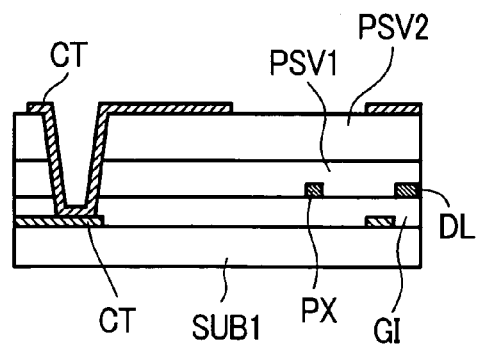

FIG. 9 is a constitutional view showing another embodiment of the liquid crystal display device according to the present invention and corresponds to FIG. 6.

Compared with a case shown in FIG. 6, the region A of the pixel region has the substantially equal constitution. However, in the region B, a protective film PSV2 is formed on an upper surface of the protective film PSV1, and the counter electrodes CT are formed on an upper surface of the protective film PSV2.

To obviate a drawback attributed to the difference of light transmissivity caused by a fact that the light passes through the liquid crystal layer twice in the region A which constitutes the light reflective portion and passes through once in the region B which constitutes the light transmissive portion, a first-order birefringence mode is adopted with respect to the region B and a second-order birefringence mode is adopted with respect to the region A.

That is, in expressing the light transmissivity in the birefringence mode, in general, the light transmissivity $T/T_0$, when a uniaxial birefringence medium is inserted between two polarizers which are arranged orthogonally from each other, is expressed by a following formula (1).

$$T/T_0 = \sin^2(2\chi_{eff}) \cdot \sin^2(\pi d_{eff} \cdot \Delta n/\lambda) \quad (1)$$

Here, $\chi_{eff}$ indicates an effective optical axis direction (an angle made by an optical axis and a change transmission axis) of liquid crystal composition, $d_{eff}$ indicates an effective thickness of a liquid crystal composition layer having the birefringence, $\Delta n$ indicates the reflectance anisotropy, and $\lambda$ indicates a wavelength of light.

Here, the reason that the optical axis direction of the liquid crystal composition layer is set as the effective value is that the liquid crystal molecules are fixed to an interface in the inside of an actual cell, all of liquid crystal molecules in the inside of the cell are not arranged in parallel and uniformly at the time of applying an electric field to the liquid crystal, and the large deformation is generated in the liquid crystal in the vicinity of the interface and hence, the light axis direction of the liquid crystal composition layer is treated as an apparent value when a uniform state is assumed as an average value with respect to the light axis directions of the liquid crystal composition layer.

For example, to obtain the normally-closed characteristic in which a dark state is obtained at the time of applying a low voltage and a bright state is obtained at the time of applying a high voltage, as the arrangement of polarizers, a transmission axis (or an absorption axis) of one polarizer may be arranged substantially parallel to the orientation direction (a rubbing direction) of the liquid crystal molecules and a transmission axis of another polarizer may be arranged substantially perpendicular to the orientation direction of the liquid crystal molecules.

Since $\chi_{eff}$ in the above formula (1) is 0 at the time of applying no electric field, $T/T_0$ becomes 0.

On the other hand, at the time of applying an electric field, a value of $\chi_{eff}$ is increased corresponding to a field strength and the value of $\chi_{eff}$ becomes maximum when the light axis direction is 45°.

In this case, assuming that a wavelength of the light is 0.555 μm, for example, to make the uniaxial birefringence medium become achromatic and have the maximum transmissivity, the effective $d_{eff} \cdot \Delta n$ may be set to 0.28 μm which is a ½ wavelength.

This implies that by setting the thickness of the liquid crystal layer in the region A which uses the second-order birefringence mode approximately three times, that is approximately 2.5 times to 3.5 times as large as the thickness of the liquid crystal layer in the region B which uses the first-order birefringence, it is possible to optimize the displays of these respective regions.

Here, in FIG. 9, the counter electrode CT includes the counter electrode which is formed in a state that the counter electrode which covers the drain signal line DL and has a function of terminating lines of electric force generated by the electric field from the drain signal line DL as described above. The counter electrode CT is electrically connected with the counter electrode CT which is formed on the region A and is also formed on the region B side in a slightly extended manner via a through hole formed in the protective film PSV2, PSV1 and the insulation film GI in a penetrating manner.

Embodiment 9

Figure 10A:
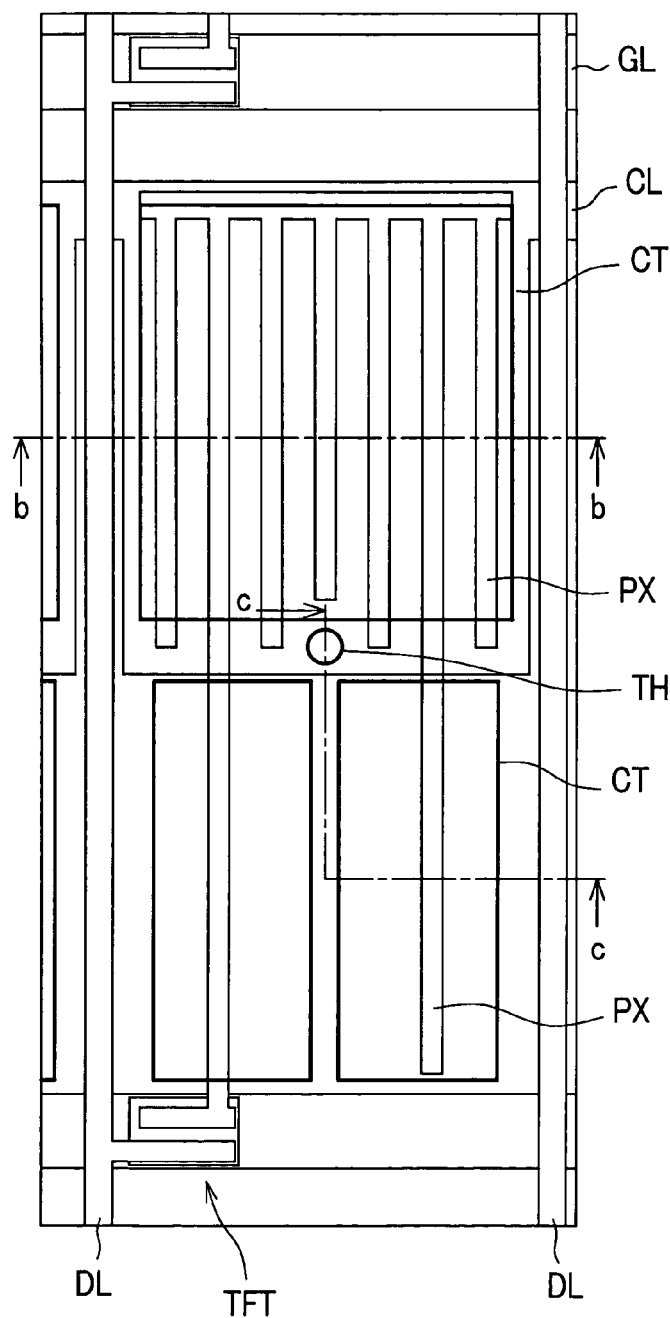
FIG. 10 is a constitutional view showing another embodiment of the pixel of the liquid crystal display device according to the present invention.
Figure 10B:
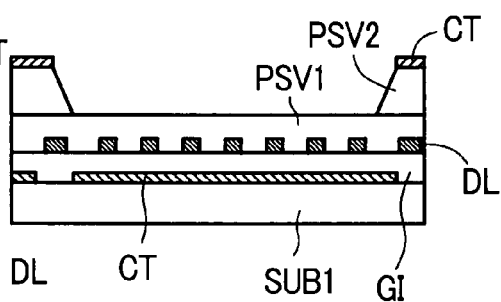
Figure 10C:
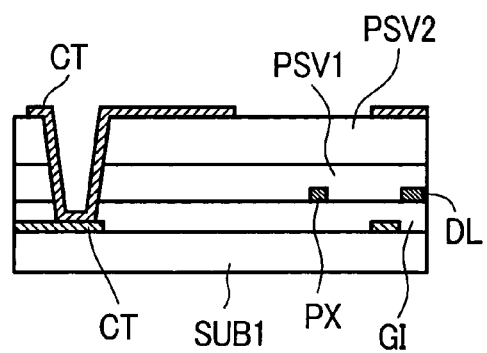

FIG. 10 is a constitutional view showing another embodiment of the liquid crystal display device according to the present invention and corresponds to FIG. 9.

The constitution which makes this embodiment different from the embodiment shown in FIG. 9 lies in that, first of all, the protective film PSV2 which is formed on the region B of the pixel region is also formed on the region A, and an opening is formed in a center portion except for a slight periphery of the protective film PSV2 of the region A.

Further, the counter electrode formed on a surface of the protective film PSV2 is formed also to cover the drain signal line DL and the gate signal line GL on the region A side.

Due to such a constitution, the whole drain signal line DL is covered with the counter electrode CT having a shielding function thus achieving advantageous effects such as the enhancement of the numerical aperture and the reduction of longitudinal smear.

Embodiment 10

Figure 11:
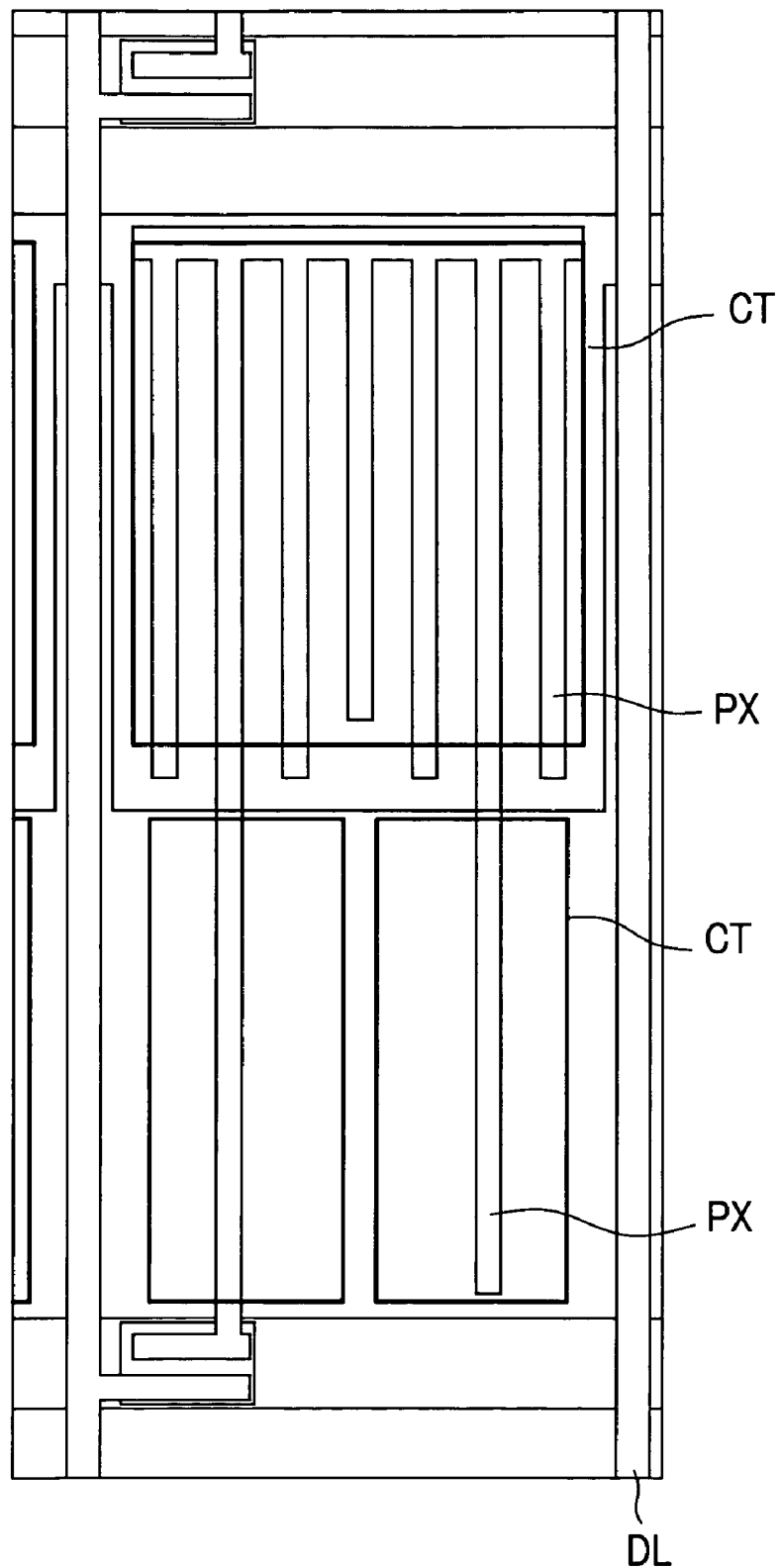
FIG. 11 is a plan view showing another embodiment of the pixel of the liquid crystal display device according to the present invention.

FIG. 11 is a constitutional view showing another embodiment of the liquid crystal display device according to the present invention and corresponds to FIG. 10 (*a*).

The constitution which makes this embodiment different from the embodiment shown in FIG. 10 (*a*) lies in that the counter electrode CT which is formed on an upper surface of the protective film PSV2 is constituted of a non-light-transmitting material layer such as metal.

Due to such a constitution, it is possible to select a low resistance material as a material of the counter electrode CT and to directly supply the counter voltage signal to the counter electrode and hence, it is possible to provide the constitution which has no through hole.

Further, it is possible to allow the counter electrode CT per se also to perform a function of a black matrix.

Embodiment 11

Figure 12:
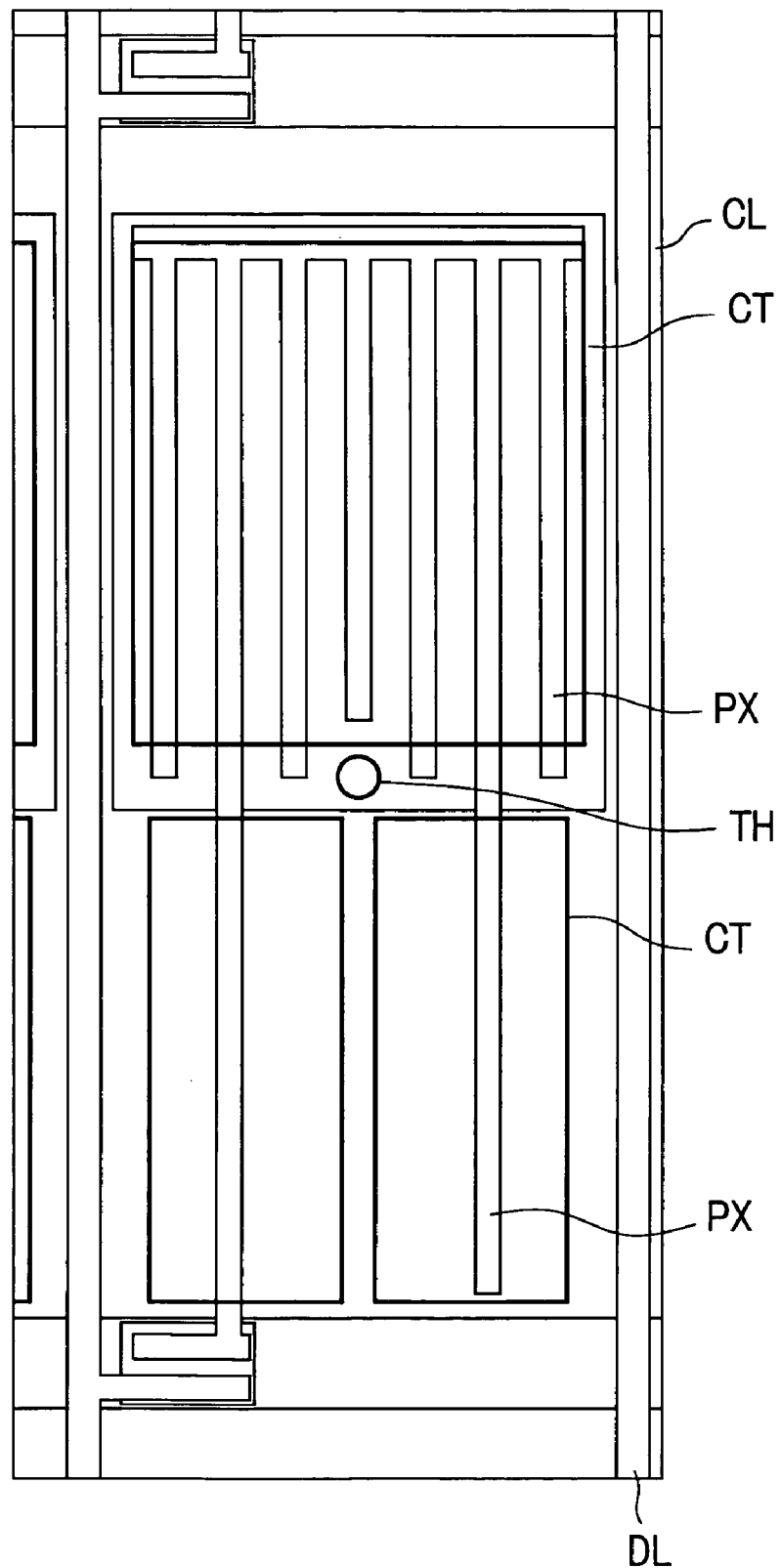
FIG. 12 is a plan view showing another embodiment of the pixel of the liquid crystal display device according to the present invention.

FIG. 12 is a constitutional view showing another embodiment of the liquid crystal display device according to the present invention and corresponds to FIG. 11.

The constitution which makes this embodiment different from the embodiment shown in FIG. 11 lies in that the counter electrode CT which is formed on the upper surface of the protective film PSV2 and the counter electrode CT which is formed below the insulation film GI in the region A are connected with each other via a through hole TH formed in the protective film PSV2, the protective film PSV1 and the insulation film GI in a penetrating manner.

As shown in FIG. 11, by directly supplying the counter voltage signal to the counter electrode CT formed on an upper surface of the protective film PSV2, it is possible to obtain an advantageous effect that the counter voltage signal line CL shown in FIG. 11 may not be formed.

Embodiment 12

Figure 13A:
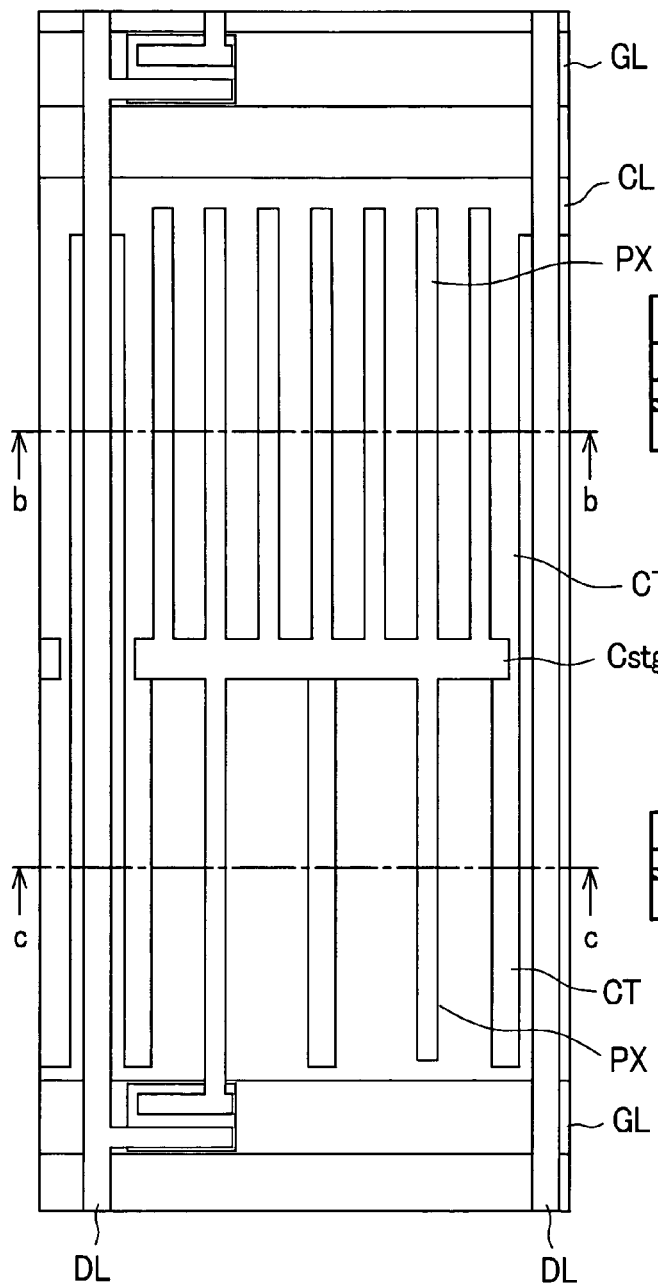
FIG. 13 is a constitutional view showing another embodiment of the pixel of the liquid crystal display device according to the present invention.
Figure 13B:
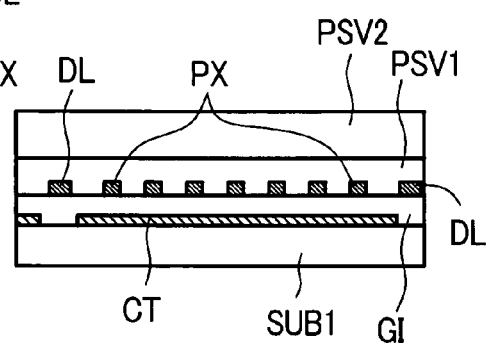
Figure 13C:
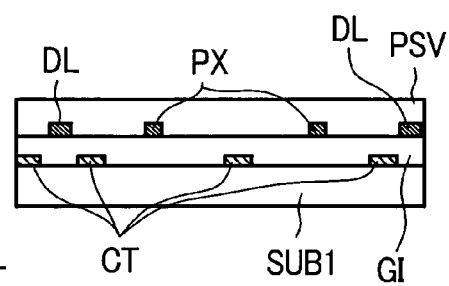

FIG. 13 is a constitutional view showing another embodiment of the liquid crystal display device according to the present invention and corresponds to FIG. 7.

The constitution which makes this embodiment different from the embodiment shown in FIG. 7 lies in that in the region A which constitutes a light reflective portion, the protective film PSV2 is formed on an upper surface of the protective film PSV1.

This constitution is provided for making a thickness of the liquid crystal layer in the light reflective portion smaller than a thickness of the light transmissive portion.

Since the light passes through the liquid crystal layer twice in the reflective portion, the layer thickness of the liquid crystal layer is decreased correspondingly.

Accordingly, it is possible to perform a display of both regions A, B using a first-order birefringence mode. In this case, it is preferable to set a thickness of the protective film PSV2 to ½ to ⅔ of the thickness of the liquid crystal layer.

This is because that such thickness relationship can maximize the respective transmissivities and reflectances of the regions A, B.

Embodiment 13

Figure 14A:
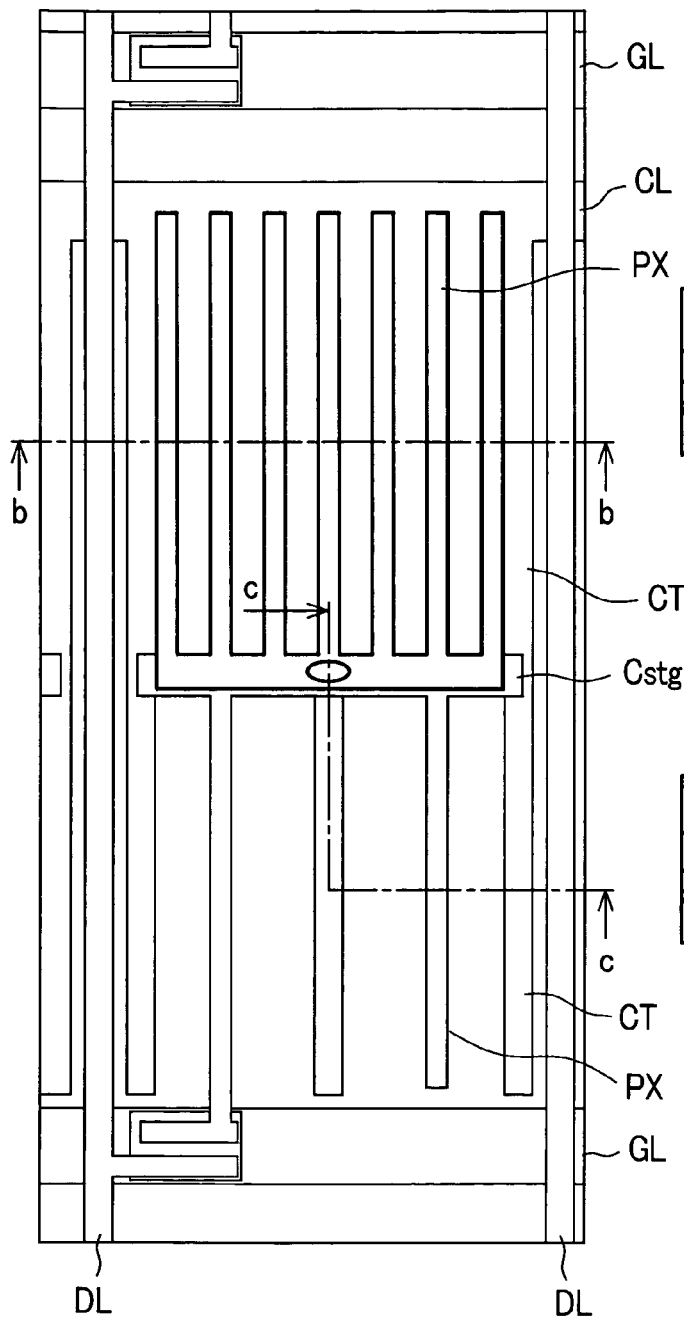
FIG. 14 is a constitutional view showing another embodiment of the pixel of the liquid crystal display device according to the present invention.
Figure 14B:
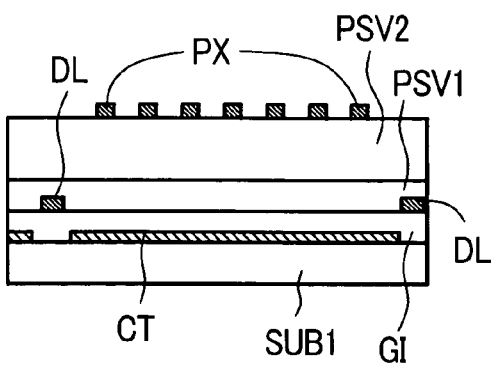
Figure 14C:
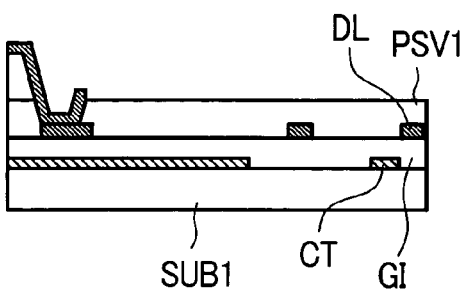

FIG. 14 is a constitutional view showing another embodiment of the liquid crystal display device according to the present invention and corresponds to FIG. 13.

The constitution which makes this embodiment different from the embodiment shown in FIG. 13 lies in that on an upper surface of the protective film PSV2 which is formed on the region A which constitutes a light reflective portion, the pixel electrodes PX are formed. The pixel electrodes PX may be formed of a light-transmitting material layer.

In this case, the respective pixel electrodes PX are electrically connected with each other in the boundary portion between the region A and the region B which constitutes a light transmitting portion and, at the same time, the respective pixels are electrically connected with the pixel electrodes PX of the region B via a through hole formed in the protective film PSV1.

Embodiment 14

Figure 15A:
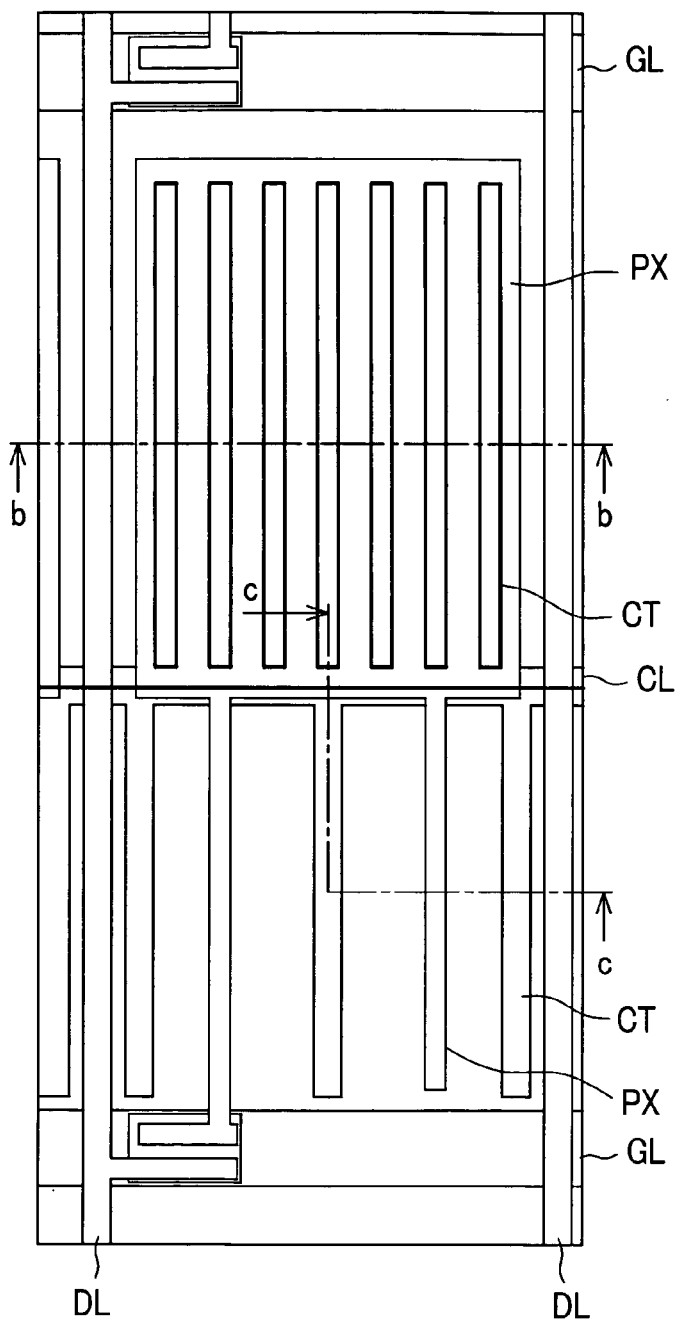
FIG. 15 is a constitutional view showing another embodiment of the pixel of the liquid crystal display device according to the present invention.
Figure 15B:
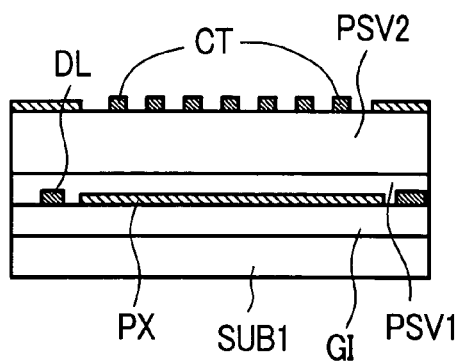
Figure 15C:
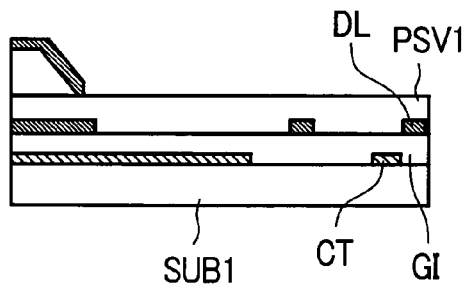

FIG. 15 is a constitutional view showing another embodiment of the liquid crystal display device according to the present invention and corresponds to FIG. 14.

The constitution which makes this embodiment different from the embodiment shown in FIG. 14 lies in that in the region A of the pixel region, the pixel electrodes PX are formed on the same layer as the drain signal lines DL and the counter electrodes CT are formed on a surface of the protective film PSV2.

In this case, the counter electrodes CT are formed in a state that the counter electrodes CT also cover the drain signal lines DL and are constituted of, for example, non-light-transmitting metal thus functioning also as a reflective electrode.

As a result, the counter electrodes CT in the region A and the counter electrodes CT in the region B are arranged on layers different from each other thus enabling the optimum setting of the counter electrodes CT with respect to the corresponding pixel electrodes PX.

Further, in this embodiment, the counter electrodes CT on the protective film PSV2 formed in the region A extend to a side wall surface of an opening portion formed in the protective film PSV2 in the region B and cover the side wall surface.

Since the counter electrodes CT are formed of a non-light-transmitting material such as metal, for example, the counter electrodes CT function as light shielding films whereby it is possible to suppress the generation of a reverse tilt domain on the side wall surface of the protective film PSV2.

Embodiment 15

Figure 16A:
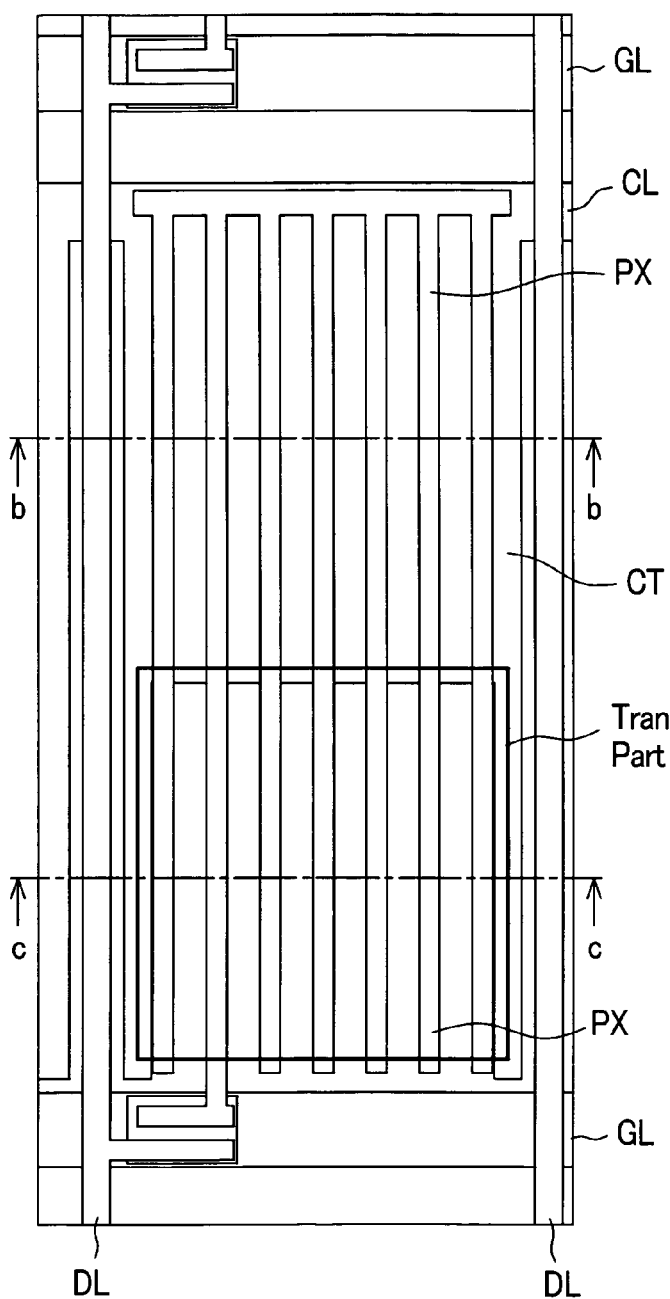
FIG. 16 is a constitutional view showing another embodiment of the pixel of the liquid crystal display device according to the present invention.
Figure 16B:
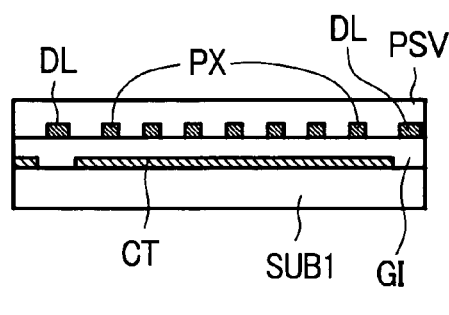
Figure 16C:
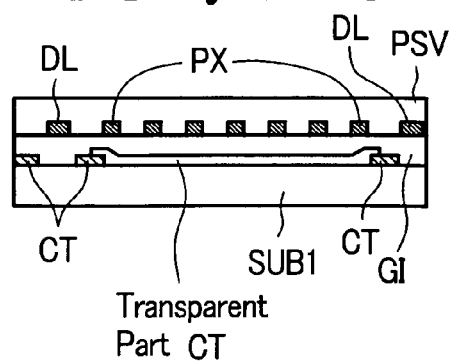

FIG. 16 is a constitutional view showing another embodiment of the liquid crystal display device according to the present invention and corresponds to FIG. 6.

To compare the constitution of this embodiment with the constitution of the embodiment shown in FIG. 6, although the region A of the pixel region has the substantially same constitution as the embodiment shown in FIG. 6, in the region B of the pixel region, the counter electrode CT in the portion is formed of a light transmitting material such as ITO, for example, in a center portion of the region except for a slight periphery of the region, and the pixel electrodes PX are constituted by directly extending the respective pixel electrodes PX in the region A.

Embodiment 16

FIG. 17 is a constitutional view showing another embodiment of the liquid crystal display device according to the present invention and corresponds to FIG. 16.

The constitution which makes this embodiment different from the embodiment shown in FIG. 16 lies in that although the protective film PSV2 which is formed of an organic material is formed on the upper surface of the protective film PSV1 and, at the same time, an opening is formed in a center portion of the region B of the pixel region except for a slight periphery of the region B.

Embodiment 17

Figure 18A:
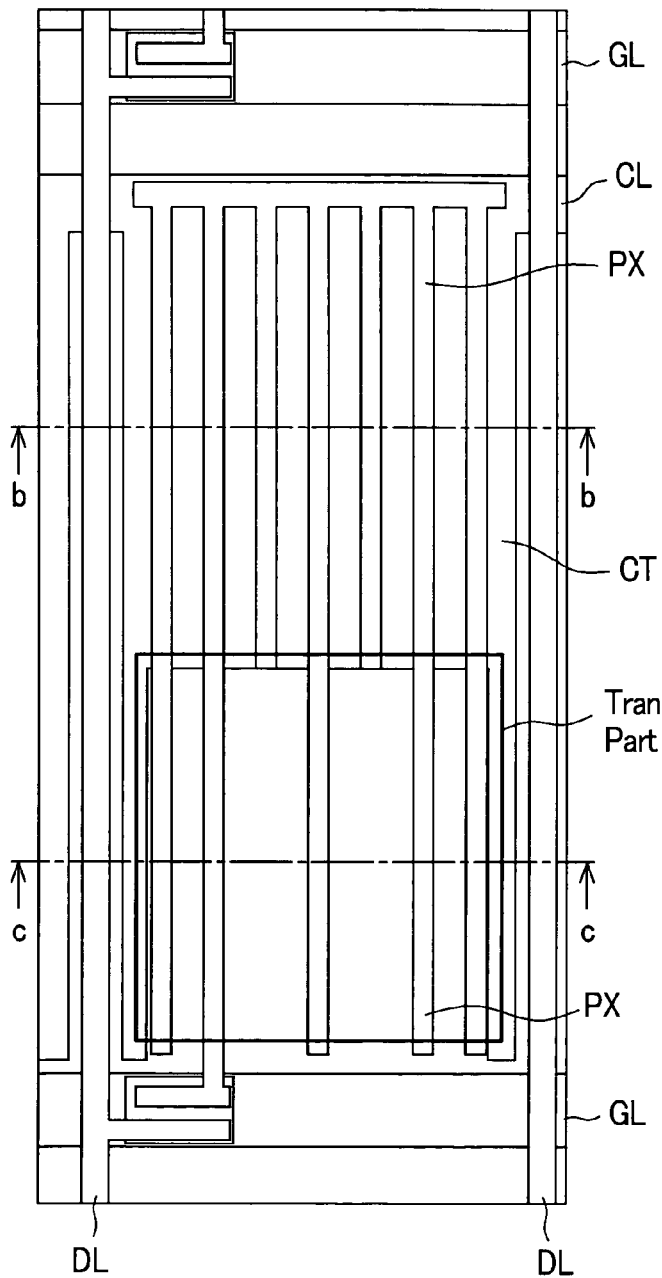
FIG. 18 is a constitutional view showing another embodiment of the pixel of the liquid crystal display device according to the present invention.
Figure 18B:
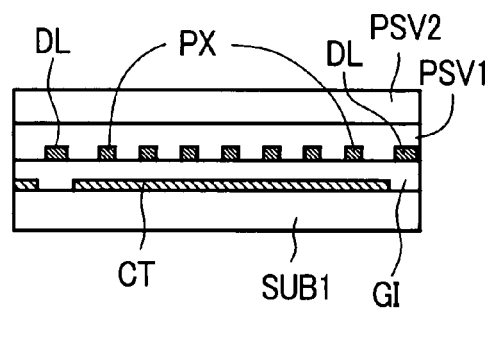
Figure 18C:
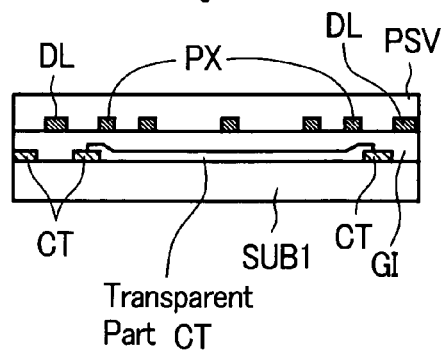

FIG. 18 is a constitutional view showing another embodiment of the liquid crystal display device according to the present invention and corresponds to FIG. 17.

The constitution which makes this embodiment different from the embodiment shown in FIG. 17 lies in that the number of the pixel electrodes PX in the region B of the pixel region is partially decreased.

Embodiment 18

Figure 19A:
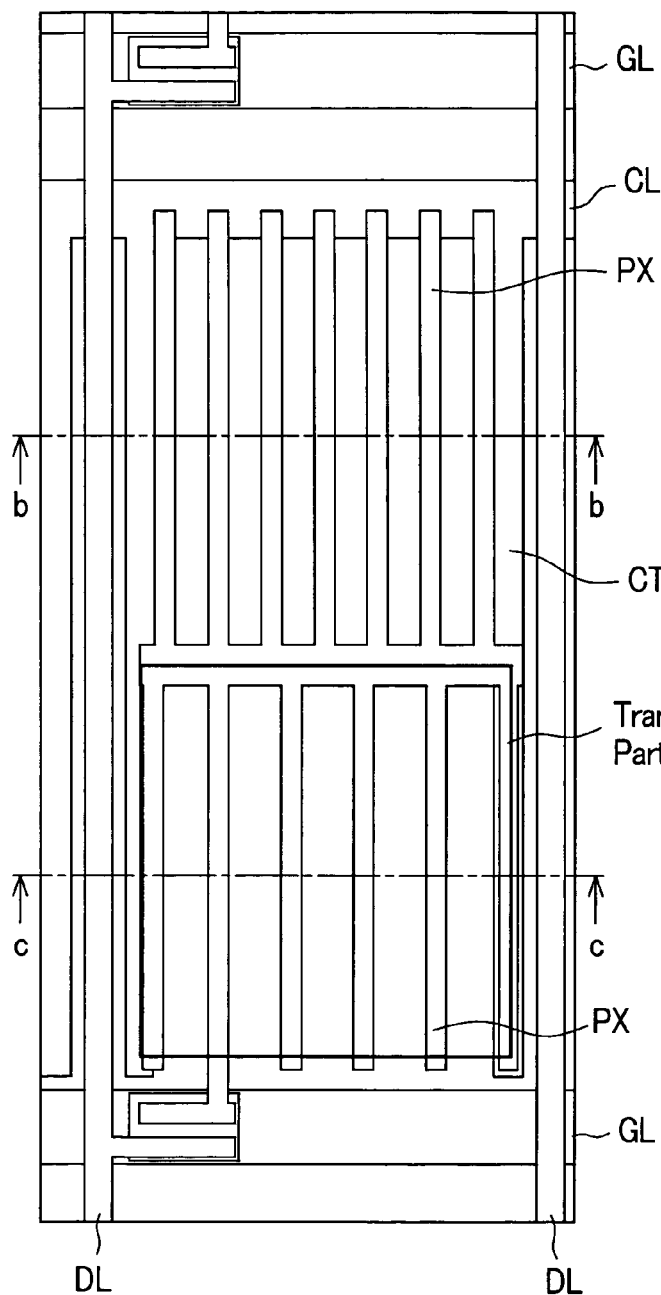
FIG. 19 is a constitutional view showing another embodiment of the pixel of the liquid crystal display device according to the present invention.
Figure 19B:
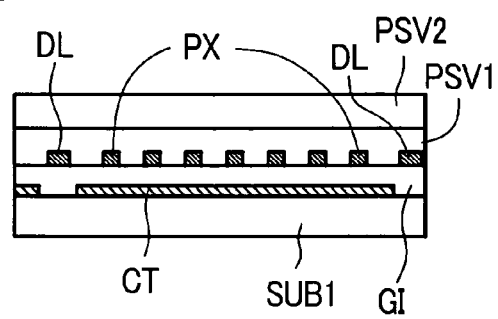
Figure 19C:
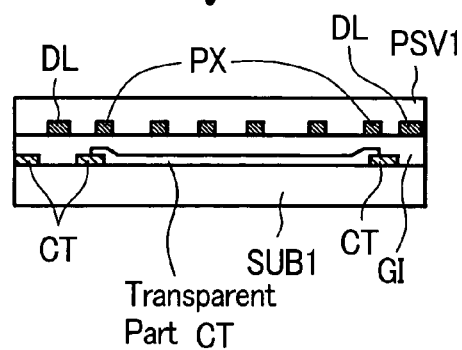

FIG. 19 is a constitutional view showing another embodiment of the liquid crystal display device according to the present invention and corresponds to FIG. 18.

The constitution which makes this embodiment different from the embodiment shown in FIG. 18 lies in that the number of the pixel electrodes PX in the region B of the pixel region is set smaller than the number of the pixel electrodes PX in the region A of the pixel region, the respective intervals of the pixel electrodes PX are set equal.

Embodiment 19

Figure 20A:
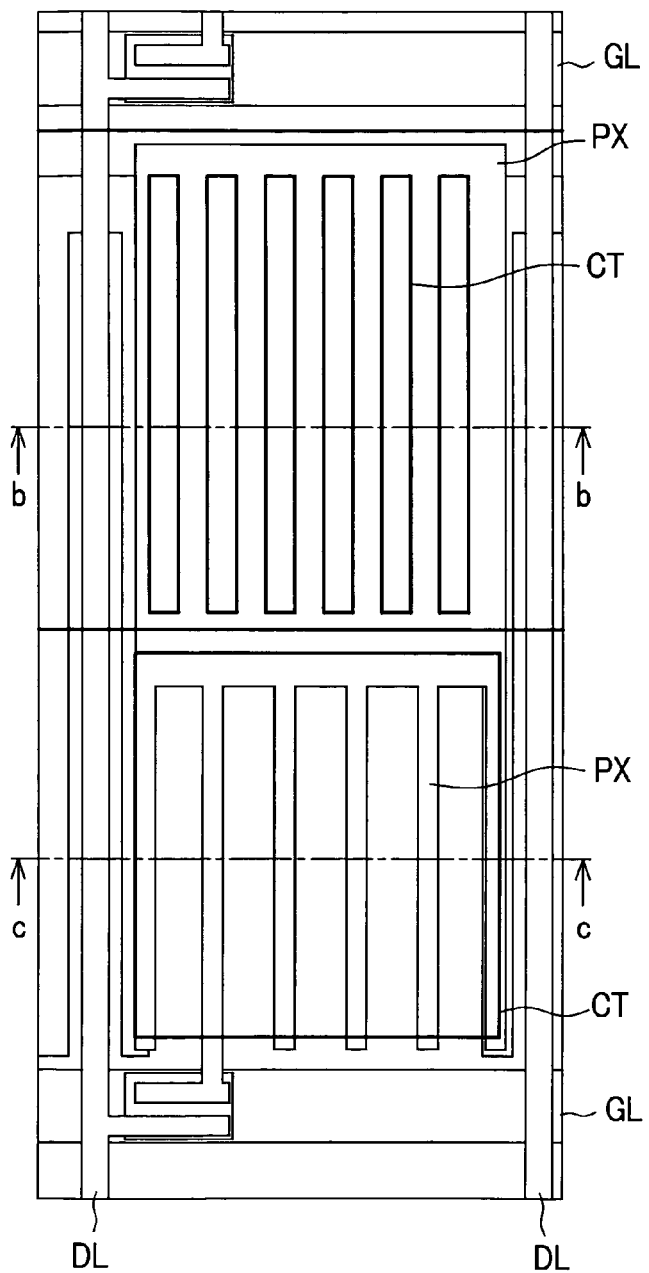
FIG. 20 is a constitutional view showing another embodiment of the pixel of the liquid crystal display device according to the present invention.
Figure 20B:
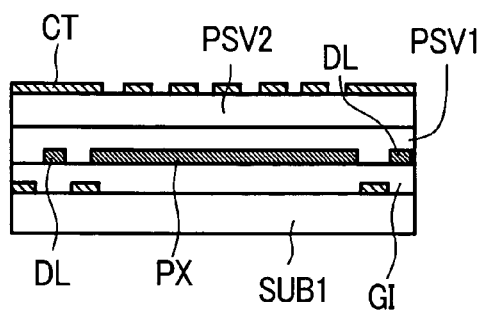
Figure 20C:
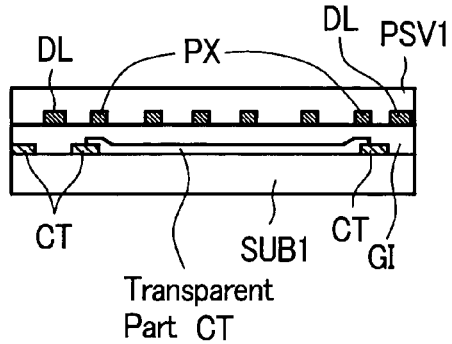
Figure 21A:
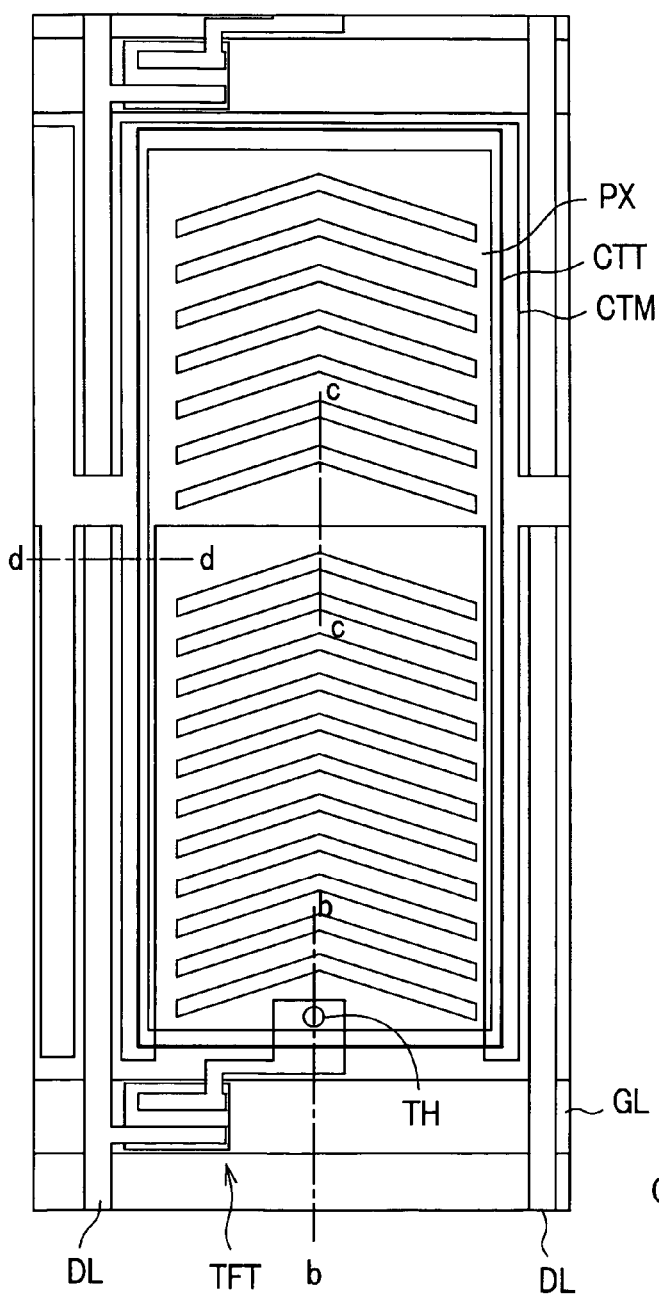
FIG. 21 is a constitutional view showing another embodiment of the pixel of the liquid crystal display device according to the present invention.
Figure 21B:
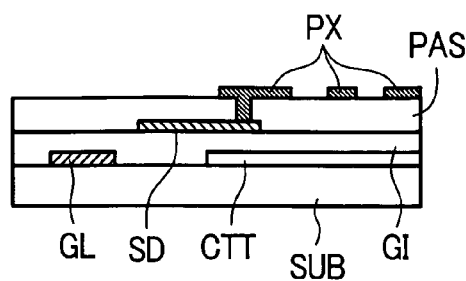
Figure 21C:
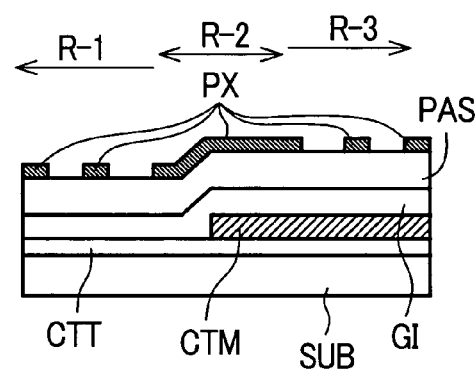
Figure 21D:
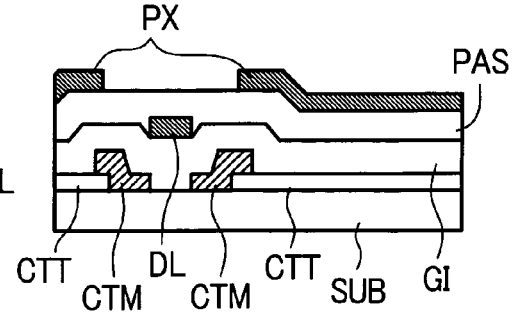

FIG. 20 is a constitutional view showing another embodiment of the liquid crystal display device according to the present invention and corresponds to FIG. 19.

The constitution which makes this embodiment different from the embodiment shown in FIG. 19 lies in that, in the region A of the pixel region, the pixel electrodes PX and the drain signal lines DL are formed on the same layer and, at the same time, the pixel electrodes PX are formed of a non-light-transmitting material such as metal.

Further, the protective film PSV2 which is made of an organic material is formed on an upper surface of the protective film PSV1 and the counter electrodes CT are formed on an upper surface of the protective film PSV2. In this case, the counter electrodes CT are formed in a state that the counter electrodes CT cover the drain signal lines DL in the region and, further, the counter electrodes CT are made of a non-light transmitting material such as metal.

Embodiment 20

FIG. 21 is a view showing another embodiment of the liquid crystal display device according to the present invention, wherein (a) is a plan view of the pixel, and (b), (c), (d) are respectively schematic cross-sectional views taken along lines b-b, c-c and d-d in FIG. 21.

As shown in FIG. 21(*b*), a signal from the TFT is supplied through the SD and is connected to the pixel electrode PX formed on the insulation film PAS via a through hole TH. The pixel electrode PX is formed of a transparent electrode. As an example, ITO, IZO, ITZO and the like can be used and ITO is used in this embodiment.

Below the PX, a transparent counter electrode CTT is formed by way of the insulation film. The CTT is also formed of a transparent electrode and the counter electrode CTT is formed of ITO in this embodiment.

In FIG. 21(*c*), a stepped portion is observed. The transparent counter electrode CTT is formed on the substrate SUB and a metal counter electrode CTM is formed on a portion thereof. On the CTT and the CTM, the pixel electrode PX is formed by way of an insulation film. Due to such a constitution, the pixel is constituted by having two regions therein such that the CTM forming portion functions as a reflective type and the CTM non-forming portion functions as a transmissive type attributed by the CTT. In the drawing, the reflective region is indicated by R-3, the transmissive region is indicated by R-1, and an intermediate region is indicated by R-2.

In the reflective region, the light which is incident on the liquid crystal display device form the display screen side is reflected on the CTM and the light is irradiated to the display side again. Accordingly, the number of times that the light passes through the liquid crystal layer becomes twice compared to one time in the transmissive region. Accordingly, to maximize the light utilization efficiency, it is desirable to set the layer thickness of the liquid crystal layer in the reflective region smaller than the layer thickness of the liquid crystal layer in the transmissive region. Accordingly, in this embodiment, by stacking the metal counter electrode CTM and the transparent counter electrode CTT on the reflective region, the reflective region is constituted such that the distance from the substrate SUB to the pixel electrode PX is remote, that is, the thickness of the liquid crystal layer is decreased. Although the CTM is overlapped to the CTT from above in the drawing, it is needless to say that the reverse constitution is also applicable.

FIG. 21 (*d*) is a cross-sectional view of the vicinity of the video signal line DL. The CTM is overlapped to an end portion of the CTT. Due to such a constitution, the power supply resistance to the CTT made of the transparent electrode can be reduced by supplying the electricity from many directions using the CTM formed of the metal electrode. The gate insulation film GI is overlapped to the CTT and the CTM, and the video signal line DL is formed on the gate insulation film GI. Further, an insulation film PAS is formed above the gate insulation film and the video signal line DL, and the pixel electrode PX is formed on the insulation film PAS. The pixel electrode PX may be formed on the GI.

In FIG. 21 (*a*), a portion of the CTM is extended below the video signal line DL and is connected with the CTM between the pixels. That is, the portion of the CTM also functions as a common signal line CL.

The PX is, in the drawing, configured such that a plurality of bent-shaped members have end portions thereof connected with each other. Accordingly, in plane, an electric field is generated between the CTT or the CTM which is exposed between the PX and the PX thus performing a display. In this embodiment, the reason that the PX is bent is to achieve a so-called multi domain effect, wherein it is possible to broaden a viewing angle by setting the directions of the electric field in plural numbers.

According to the present invention, it is possible to realize the liquid crystal display device of a wide viewing angle which has the transmissive region and the reflective region in combination.

Embodiment 21

Figure 22:
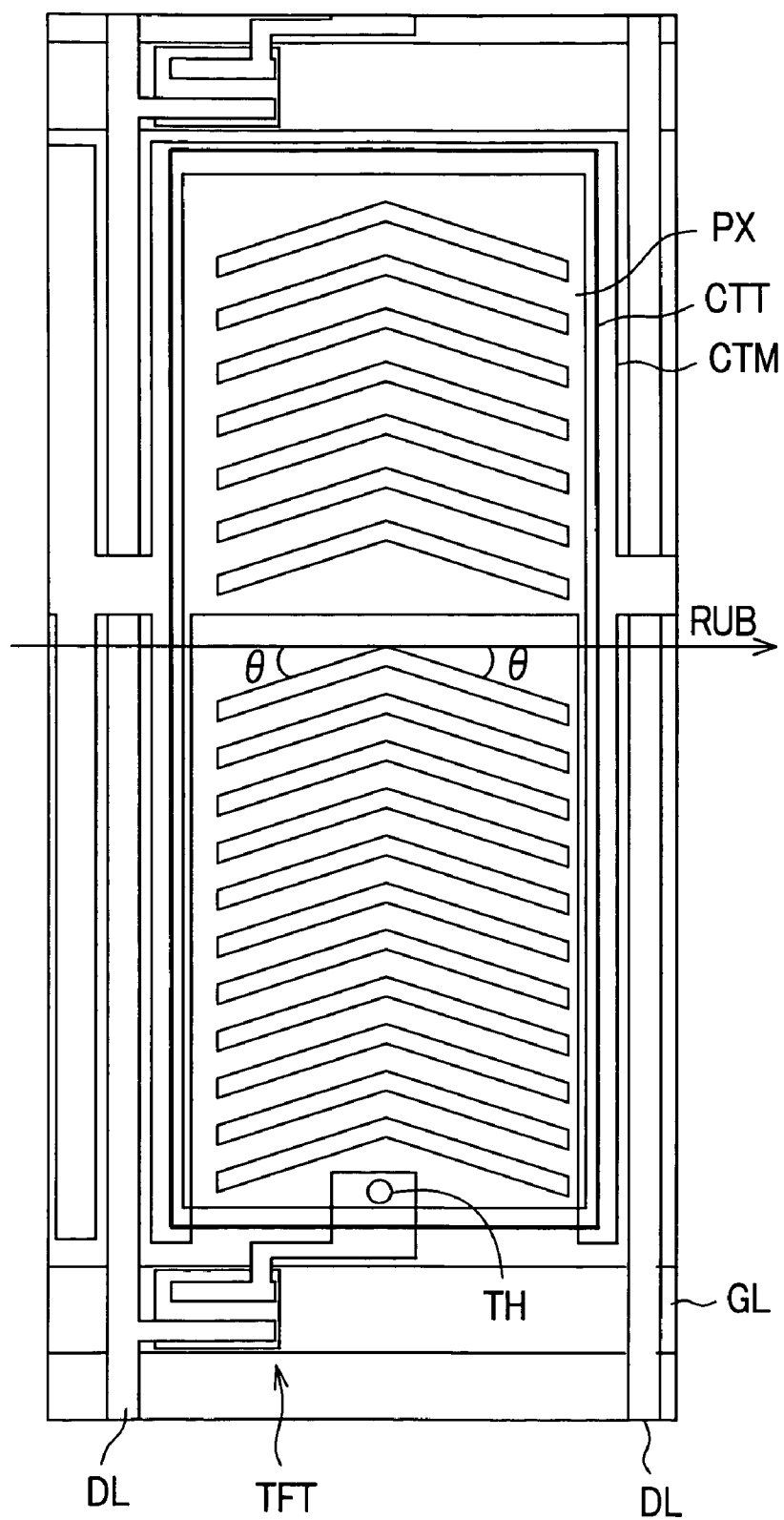
FIG. 22 is a constitutional view showing another embodiment of the pixel of the liquid crystal display device according to the present invention.

FIG. 22 is a view which corresponds to FIG. 21 and shows the relationship between the pixel and the initial orientation direction. Symbol RUB indicates the initial orientation direction and assumes a substantially same angle θ as absolute values with respect to two directions of the bent electrodes and, at the same time, the directions with respect to the bent electrodes and the RUB are made different from each other. Due to such a constitution, it is possible to maximize an advantageous effect brought about by the multi domain.

Further, the pixel is formed such that an end portion of the CTM is substantially parallel to the RUB. By adopting such a constitution, it is possible to smoothly perform the orientation treatment at a stepped portion thus realizing the enhancement of a contrast ratio.

Embodiment 22

Figure 23A:
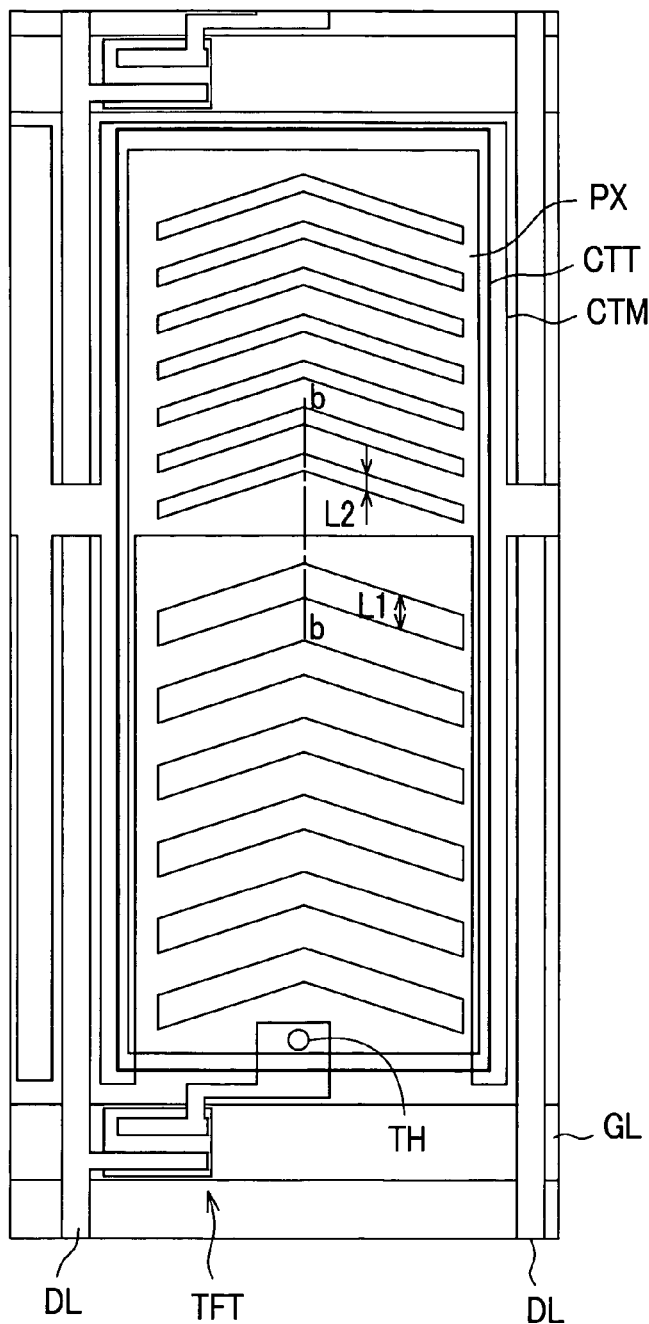
FIG. 23 is a constitutional view showing another embodiment of the pixel of the liquid crystal display device according to the present invention.
Figure 23B:
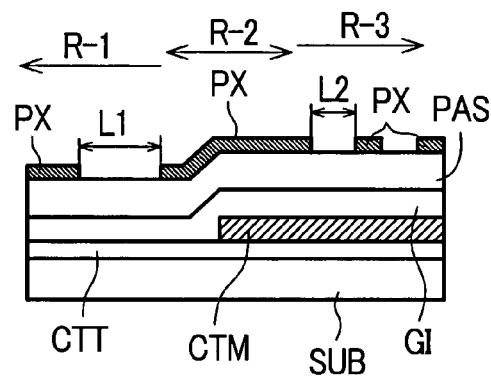

FIG. 23 shows another embodiment corresponding to FIG. 21, wherein (b) is a schematic cross-sectional view taken along a line b-b in FIG. 23 (a).

The distance between the pixel electrodes PX is set to L1 in the transmissive region R-1 and L2 in the reflective region R-3. In the transmissive region, the distance from the substrate SUB to the pixel electrode PX is configured to be smaller than the corresponding distance in the reflective region. That is, the thickness of the liquid crystal layer in the transmissive region is set larger than the thickness of the liquid crystal layer in the reflective region. Due to such a constitution, a drive voltage of the liquid crystal in the transmissive region becomes lower than the drive voltage of the liquid crystal in the reflective region. This is because that the brightness elevation characteristic with respect to the voltage of the liquid crystal layer depends on the layer thickness of the liquid crystal layer. Accordingly, assuming that L1 and L2 are equal, the brightness characteristic with respect to the voltage, that is, a so-called B-V curve largely differs between the transmissive portion and the reflective portion.

Accordingly, in this embodiment, the distance between the pixel electrodes PX is set such that the L2 in the reflective region is smaller than the L1 in the transmissive region, that is, L1>L2.

Accordingly, by adjusting the field strength, it is possible to make the B-V curves in the transmissive portion and the reflective portion come close to each other whereby the liquid crystal display device which is suitable for both of transmission and reflection can be realized.

Embodiment 23

Figure 24A:
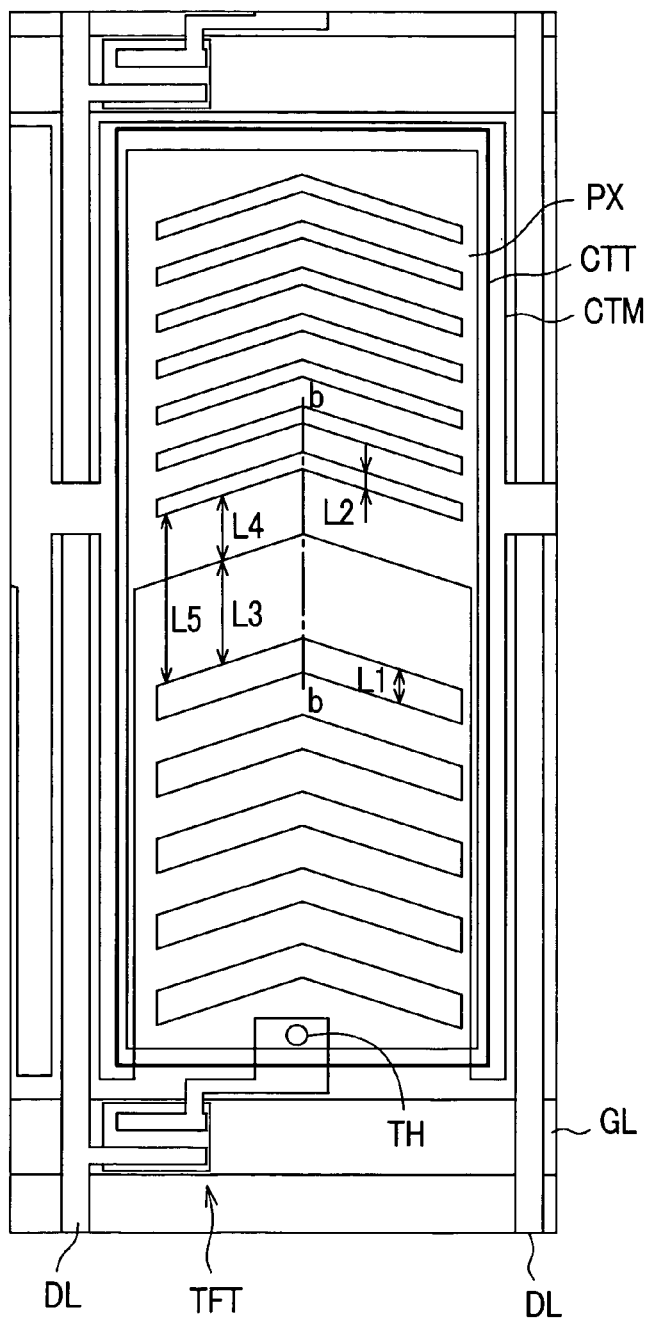
FIG. 24 is a constitutional view showing another embodiment of the pixel of the liquid crystal display device according to the present invention.
Figure 24B:
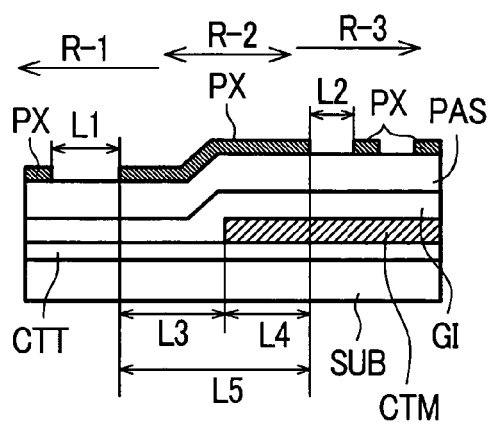

FIG. 24 is another embodiment corresponding to FIG. 21, wherein (b) is a schematic cross-sectional view taken along a line b-b in FIG. 24 (a).

An intermediate region R-2 portion belongs to neither one of the reflective region and the transmissive region and hence, becomes a cause of a domain. Accordingly, a stepped portion is covered with the pixel electrode PX. Here, by adopting a normally black mode in which a black display is performed at the time of applying no voltage, even when the pixel electrode PX is constituted of a transparent electrode, a voltage above the stepped portion assumes the same potential due to the pixel electrode PX and hence, the generation of the domain can be prevented thus realizing a display with a high contrast ratio.

Further, this embodiment can also realize the prevention of the domain at the time of applying a voltage.

In this embodiment, with respect to the pixel electrode PX on the stepped portion, by setting a width thereof on a transmissive region R-1 side as L3 and the width thereof on a reflective region R-3 side as L4, the relationship L3>L4 is established. Since the liquid crystal is driven in the transmissive region with a voltage lower than a voltage in the reflective region, the center of the pixel electrode PX on the stepped portion is displaced from the step thus arranging the pixel electrode PX to satisfy the relationship L3>L4, it is possible to maintain the stepped portion at a fixed potential effectively thus suppressing the generation of the domain.

Further, provided that a width L5 of the pixel electrode on the step satisfies the relationships L5>L1, L5>L2, it is desirable to make the width L5 to further satisfy the relationship L5>(L1+L2). This is because that it is possible to maintain the PX on the stepped portion at the fixed potential in a more stable manner.

Further, in the same manner, it is desirable that relationships L3>L1, L4>L2 are satisfied.

In this embodiment, as can be clearly understood from the drawing, an end portion of a metal counter electrode CTM is formed in a bent shape in the same manner as the pixel electrode PX. Due to such a constitution, the stepped portion becomes parallel to the bent shape of the PX and hence, it is possible to maintain the above-mentioned relationships in a stable manner within a wider range whereby the domain can be suppressed.

Although this embodiment adopts the structure in which the pixel electrode PX is formed above the counter electrode CTT or CTM, this embodiment is also applicable to the structure in which the layer relationship between the CTT and the PX is reversed. In such a case, it is sufficient that the transparent counter electrode CTT formed on the stepped portion satisfies the relationship similar to the pixel electrode PX formed on a stepped portion as explained in this embodiment.

Embodiment 24

Figure 25A:
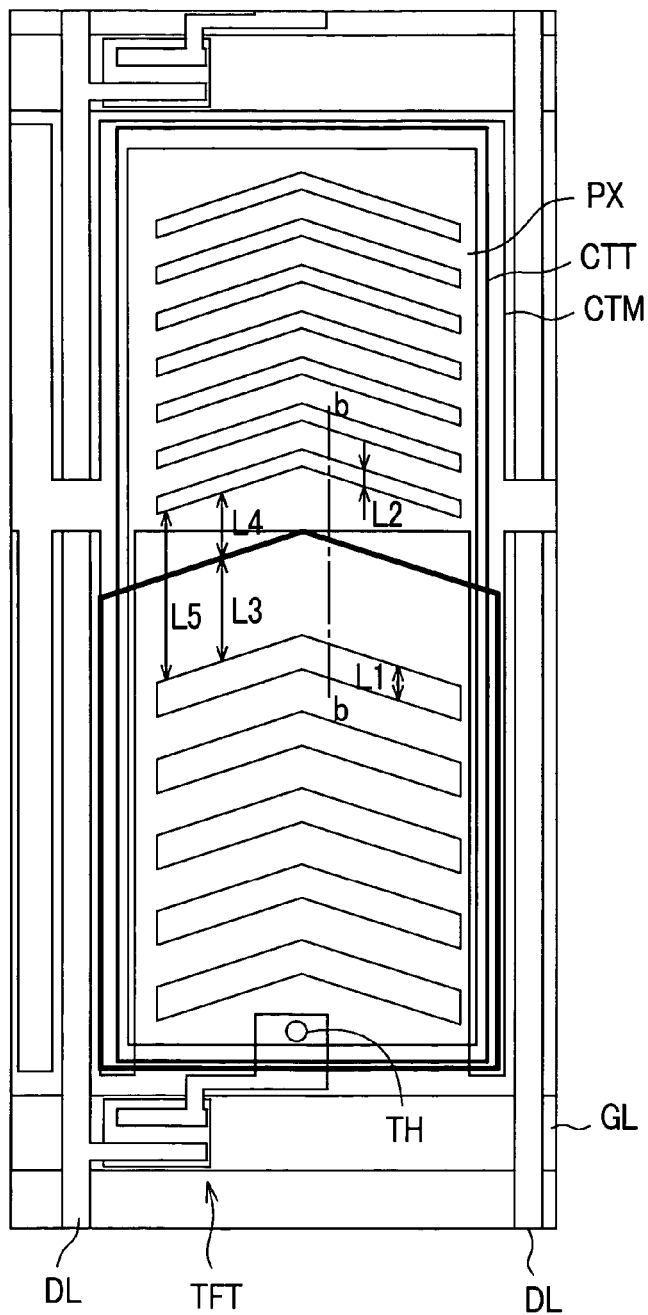
FIG. 25 is a constitutional view showing another embodiment of the pixel of the liquid crystal display device according to the present invention.
Figure 25B:
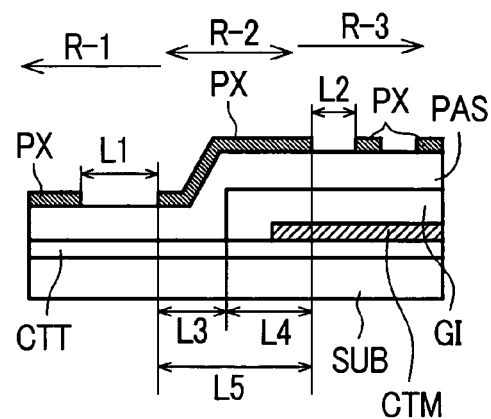

FIG. 25 shows another embodiment corresponding to FIG. 21, wherein (b) is a schematic cross-sectional view taken along a line b-b in FIG. 25 (a).

This embodiment is characterized in that the generation of the step is performed using an insulation layer. Due to such a constitution, it is possible to freely adjust the step such that a thickness of the step becomes equal to or more than a film thickness of the metal counter electrode CTM and hence, it is possible to easily realize the optimization of the transmissive region and the reflective region.

In this embodiment, the step is formed using the insulation film GI. Further, this embodiment obtains an advantageous effect that the step formed by the insulation film can be formed independently from a shape of the metal electrode. Accordingly, as shown in FIG. 25(a), an end portion of the GI is formed in a shape similar to the shape of the metal counter electrode CTM shown in FIG. 24(a). Accordingly, it is possible to adopt a concept of the embodiment 23 so as to obtain the advantageous effect of the embodiment 23. Further, it is no more necessary to use the end portion of the metal counter electrode CTM in the formation of the step and hence, the end portion of the metal counter electrode CTM can be optimized for other purpose.

For example, FIG. 25(a) shows an example which aims at the enhancement of a yield ratio by arranging the end portion of the metal counter electrode CTM parallel to the GL.

Figure 26A:
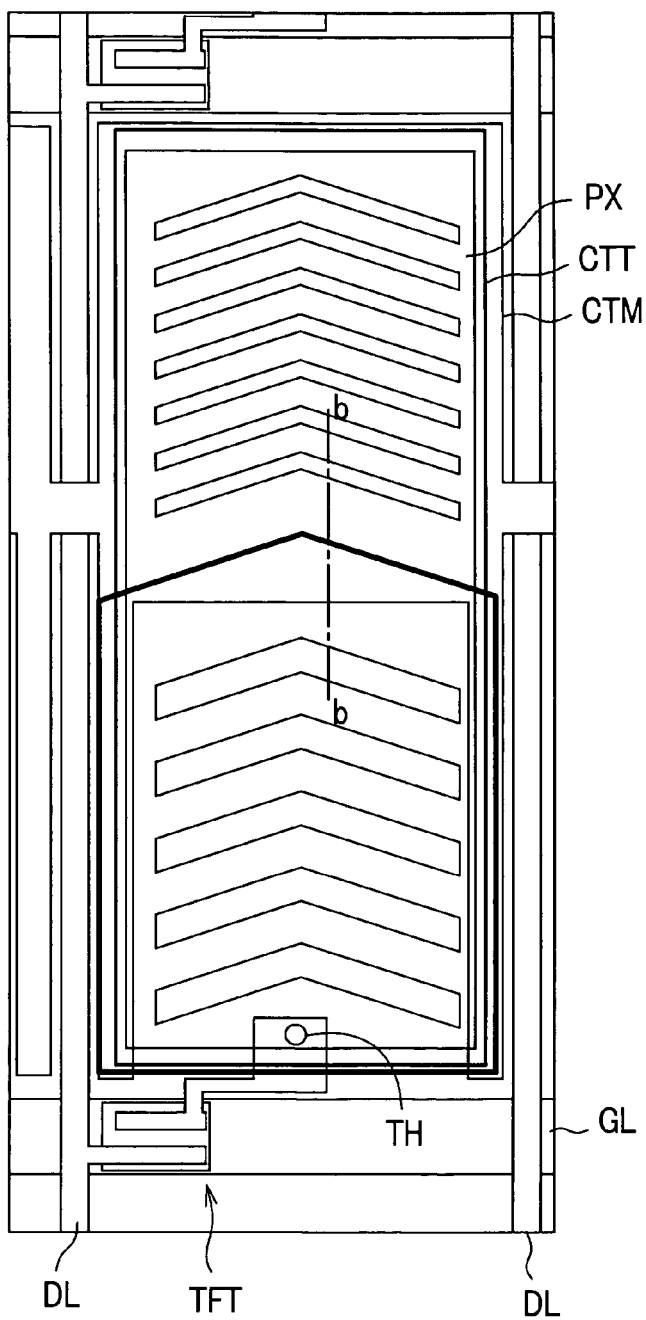
FIG. 26 is a constitutional view showing another embodiment of the pixel of the liquid crystal display device according to the present invention.
Figure 26B:
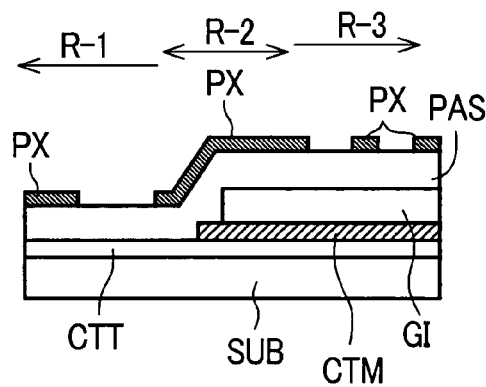

Further, FIG. 26 corresponds to FIG. 25(a) and shows an example in which the metal counter electrode CTM is used as a light shielding layer in the transmissive region, and by extending this region to the transmissive region side than the stepped portion, the step portion is shielded from light thus eliminating the domain more efficiently.

It is needless to say that the above-mentioned respective embodiments may use the respective concepts in a single form or in combination. This is because that the explanation made in a separated manner for respective embodiments is made for facilitating the explanation and the understanding of the invention by those who are skilled in the art.

Further, by constituting a monitor, a TV receiver set, a mobile phone or the like using such a display device, it is possible to realize the enhancement of the display performance of the monitor, the TV receiver set or the mobile phone.

As has been clearly understood from the above-mentioned explanation, according to the liquid crystal display device of the present invention, it is possible to realize the display device which exhibits the wide viewing angle and the high-speed response. Further, it is possible to realize the high-quality display device which possesses the transmissive region and the reflective region in combination with the wide viewing angle.

INDUSTRIAL APPLICABILITY

The present invention is applicable to the display device as described above and can be put into practice in a display manufacturing industry, and more particularly, in a liquid crystal display device manufacturing industry.

The invention claimed is:

1. A display device comprising:
on a liquid-crystal-side surface of one substrate of a pair of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region;
the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode;
the pixel region is constituted of divided respective regions; wherein
in one region, the counter electrode made of one of a light-transmitting material and a light-reflecting material extends over the one region so as to be substantially planar at a center of the one region except at a periphery of the one region and to be below an insulation film, and the pixel electrode which is constituted of a group of electrodes which extend in one direction and are arranged in parallel to each other in a direction which intersects the one direction in the one region so as to be above the insulation film in a state that the group of electrodes of the pixel electrode is overlapped to the substantially planar counter electrode in the one region in plan view, and
in another region, the counter electrode which is constituted of a group of electrodes which extend in one direction and are arranged in parallel to each other in a direction which intersects the one direction in the another region so as to be below the insulation film, and the pixel electrode which is constituted of a group of electrodes which extend in the one direction and are arranged in parallel in the direction which intersects the one direction in the another region so as to be above the insulation film and is arranged alternately with the group of electrodes of the counter electrode in the another region in plan view.

2. A display device comprising:
on a liquid-crystal-side surface of one substrate of a pair of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region;
the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode;
the pixel region is constituted of divided respective regions; wherein
in one region, the pixel electrode made of one of a light-transmitting material and light-reflecting material extends over the one region so as to be substantially planar at a center of the one region except at a periphery of the one region and to be below an insulation film, and the counter electrode which is constituted of a group of electrodes which extend in one direction and are arranged in parallel to each other in a direction which intersects the one direction in the one region so as to be above the insulation film in a state that the group of electrodes of the counter electrode is overlapped to the substantially planar pixel electrode in the one region in plan view,
in another region, the pixel electrode which is constituted of a group of electrodes which extend in one direction and are arranged in parallel to each other in a direction which intersects the one direction in the another region so as to be below the insulation film, and the counter electrode which is constituted of a group of electrodes which extend in the one direction and are arranged in parallel in the direction which intersects the one direction in the another region so as to be above the insulation film and is arranged alternately with the group of electrodes of the pixel electrode in the another region in plan view, and
each counter electrode in each region is formed in a state that the counter electrode covers the drain signal line.

3. A display device according to claim 2, wherein the respective insulation films formed in the respective regions are formed of a sequentially stacked body which is constituted of a protective film made of an inorganic material and a protective film made of an organic material, and the respective counter electrodes are formed of a light transmitting material.

4. A display device comprising:
on a liquid-crystal-side surface of one substrate of a pair of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region;

the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode; and the pixel region is constituted of divided respective regions; wherein in one region, the counter electrode extends over the one region so as to be substantially planar at a center of the one region except at a periphery of the one region and to be below an insulation film and also functions as a reflective electrode, and the pixel electrode which is constituted of a group of electrodes which extend in one direction and are arranged in parallel to each other in a direction which intersects the one direction in the one region so as to be above the insulation film in a state that the group of electrodes of the pixel electrode is overlapped to the substantially planar counter electrode in the one region in plan view, and in another region, the counter electrode which is constituted of a group of electrodes which extend in one direction and are arranged in parallel to each other in a direction which intersects the one direction in the another region so as to be below the insulation film, and the pixel electrode which is constituted of a group of electrodes which extend in the one direction and are arranged in parallel in the direction which intersects the one direction in the another region so as to be above the insulation film and is arranged alternately with the group of electrodes of the counter electrode in the another region in plan view.

5. A display device comprising:

on a liquid-crystal-side surface of one substrate of a pair of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region;

the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode; and the pixel region is constituted of divided respective regions; wherein in one region, the counter electrode extends over the one region so as to be substantially planar at a center of the one region except at a periphery of the one region and to be below an insulation film and also functions as a reflective electrode, and the pixel electrode which is constituted of a group of electrodes which extend in one direction and are arranged in parallel to each other in a direction which intersects the one direction in the one region so as to be above the insulation film in a state that the group of electrodes of the pixel electrode is overlapped to the substantially planar counter electrode in the one region in plan view, in another region, the counter electrode which is constituted of a group of electrodes which extend in one direction and are arranged in parallel to each other in a direction which intersects the one direction in the another region so as to be below the insulation film, and the pixel electrode which is constituted of a group of electrodes which extend in the one direction and are arranged in parallel in the direction which intersects the one direction in the another region so as to be above the insulation film and is arranged alternately with the group of electrodes of the counter electrode in the another region in plan view, and the insulation film has a larger thickness in another region than one region such that a film thickness of a liquid crystal layer in one region is approximately three times as large as a film thickness of a liquid crystal layer in another region.

6. A display device according to claim 5, wherein the insulation film in one region is formed of a protective film made of an inorganic material, the insulation film in another region is formed of a sequentially stacked body consisting of a protective film made of an inorganic material and a protective film made of an organic material, and at the same time, the counter electrode includes at least a counter electrode which covers the drain signal line.

7. A display device comprising:

on a liquid-crystal-side surface of one substrate of a pair of substrates which are arranged to face each other with liquid crystal therebetween, a region which is surrounded by a plurality of gate signal lines which are arranged in parallel to each other and a plurality of drain signal lines which are arranged in parallel to each other in a state that the drain signal lines intersect the gate signal lines defines a pixel region;

the pixel region includes a switching element which is operated in response to a scanning signal from the gate signal line, a pixel electrode to which a video signal from the drain signal line is supplied through the switching element, and a counter electrode which generates an electric field between the counter electrode and the pixel electrode;

the pixel region is constituted of divided respective regions; wherein in one region, the counter electrode extends over the one region so as to be substantially planar at a center of the one region except at a periphery of the one region and to be below an insulation film and also functions as a reflective electrode, and the pixel electrode which is constituted of a group of electrodes which extend in one direction and are arranged in parallel to each other in a direction which intersects the one direction in the one region so as to be above the insulation film in a state that the group of electrodes of the pixel electrode is overlapped to the substantially planar counter electrode in the one region in plan view, in another region, the counter electrode which is constituted of a group of electrodes which extend in one direction and are arranged in parallel to each other in a direction which intersects the one direction in the another region so as to be below the insulation film, and the pixel electrode which is constituted of a group of electrodes which extend in the one direction and are arranged in parallel in the direction which intersects the one direction in the another region so as to be above the insulation film and is arranged alternately with the group of electrodes of the counter electrode in the one region in plan view, and the insulation film has a layer thickness thereof in one region than the layer thickness in another region.

8. A display device according to claim 7, wherein the insulation film in another region is formed of a protective film made of an inorganic material, and the insulation film in one region is formed of a sequentially stacked body consisting of a protective film made of an inorganic material and a protective film made of an organic material.

9. A display device according to claim 1, wherein the counter electrode is made of a light-transmitting material.

10. A display device according to claim 2, wherein the pixel electrode is made of a light-transmitting material.

11. A display device according to claim 1, wherein the substantially planar counter electrode in the one region is a substantially rectangular planar counter electrode which is overlapped with the group of electrodes of the pixel electrode in the one region in plan view.

12. A display device according to claim 2, wherein the substantially planar pixel electrode in the one region is a substantially rectangular planar pixel electrode which is overlapped with the group of electrodes of the counter electrode in the one region in plan view.

13. A display device according to claim 4, wherein the substantially planar counter electrode in the one region is a substantially rectangular planar counter electrode which is overlapped with the group of electrodes of the pixel electrode in the one region in plan view.

14. A display device according to claim 5, wherein the substantially planar counter electrode in the one region is a substantially rectangular planar counter electrode which is overlapped with the group of electrodes of the pixel electrode in the one region in plan view.

15. A display device according to claim 7, wherein the substantially planar counter electrode in the one region is a substantially rectangular planar counter electrode which is overlapped with the group of electrodes of the pixel electrode in the one region in plan view.

* * * * *